United States Patent
Miyano

(10) Patent No.: US 11,759,702 B2
(45) Date of Patent: Sep. 19, 2023

(54) GAME SYSTEM, PROCESSING METHOD, AND INFORMATION STORAGE MEDIUM

(71) Applicant: BANDAI NAMCO ENTERTAINMENT INC., Tokyo (JP)

(72) Inventor: Teppei Miyano, Tokyo (JP)

(73) Assignee: BANDAI NAMCO ENTERTAINMENT INC., Tokyo (JP)

( * ) Notice: Subject to any disclaimer, the term of this patent is extended or adjusted under 35 U.S.C. 154(b) by 0 days.

(21) Appl. No.: 17/358,652

(22) Filed: Jun. 25, 2021

(65) Prior Publication Data

US 2021/0316210 A1  Oct. 14, 2021

Related U.S. Application Data

(63) Continuation of application No. PCT/JP2019/050905, filed on Dec. 25, 2019.

(30) Foreign Application Priority Data

Dec. 28, 2018 (JP) .................................. 2018-247138

(51) Int. Cl.
*A63F 13/2145* (2014.01)
*A63F 13/426* (2014.01)
(Continued)

(52) U.S. Cl.
CPC ........ *A63F 13/2145* (2014.09); *A63F 13/426* (2014.09); *A63F 13/49* (2014.09);
(Continued)

(58) Field of Classification Search
CPC . A63F 13/2145; A63F 13/426; G06F 3/04886
See application file for complete search history.

(56) References Cited

U.S. PATENT DOCUMENTS 9,626,102 B2 * 4/2017 Kim ..................... G06F 3/04842
9,851,883 B2 * 12/2017 Terrero ............... G06F 3/04847
(Continued)

FOREIGN PATENT DOCUMENTS

JP   2012-125286 A   7/2012
JP   2012-252587 A   12/2012
(Continued)

OTHER PUBLICATIONS

Mar. 24, 2020 International Search Report issued in International Patent Application No. PCT/JP2019/050905.

*Primary Examiner* — Chase E Leichliter
(74) *Attorney, Agent, or Firm* — Oliff PLC

(57) ABSTRACT

The game system includes a processor including hardware. The processor performs a reception process of receiving coordinates of a touching operation in a touch screen as touching operation coordinates when the touching operation is performed by a player with respect to the touch screen; a virtual touch area process of associating the touching operation coordinates in the virtual touch area set in the touch screen as an area smaller than the touch screen with mapping coordinates on the touch screen; when the touching operation is performed with respect to the virtual touch area, an input process of setting the mapping coordinates as input coordinates, assuming that the touching operation is performed with respect to the mapping coordinates associated with the touching operation coordinates in the virtual touch area in which the touching operation is performed; and a game process based on the input coordinates.

14 Claims, 22 Drawing Sheets

(51) Int. Cl.
*A63F 13/49* (2014.01)
*G06F 3/04886* (2022.01)

(52) U.S. Cl.
CPC .. *G06F 3/04886* (2013.01); *A63F 2300/1075* (2013.01); *A63F 2300/6045* (2013.01); *A63F 2300/63* (2013.01)

(56) References Cited

U.S. PATENT DOCUMENTS

| | | | |
|---|---|---|---|
| 9,937,415 B1* | 4/2018 | Makuch | A63F 13/22 |
| 10,770,037 B2* | 9/2020 | Kanamaru | G06F 1/1626 |
| 2005/0130738 A1* | 6/2005 | Miyamoto | A63F 13/5378 |
| | | | 463/30 |
| 2009/0070670 A1* | 3/2009 | Kishi | G06F 3/04886 |
| | | | 715/702 |
| 2011/0172013 A1* | 7/2011 | Shirasaka | A63F 13/92 |
| | | | 345/173 |
| 2012/0169610 A1* | 7/2012 | Berkes | G06F 3/04166 |
| | | | 345/173 |
| 2012/0220372 A1* | 8/2012 | Cheung | G06F 3/04886 |
| | | | 463/37 |
| 2012/0306775 A1 | 12/2012 | Miyachi et al. | |
| 2013/0237288 A1* | 9/2013 | Lee | G06F 3/0482 |
| | | | 455/566 |
| 2013/0324242 A1* | 12/2013 | Vincent | A63F 13/24 |
| | | | 463/31 |
| 2014/0066195 A1* | 3/2014 | Matsui | A63F 13/06 |
| | | | 463/30 |
| 2014/0066200 A1* | 3/2014 | Matsui | A63F 13/45 |
| | | | 463/31 |
| 2014/0118253 A1 | 5/2014 | Jeong | |
| 2014/0137036 A1* | 5/2014 | Han | G06F 3/04886 |
| | | | 715/798 |
| 2015/0138101 A1* | 5/2015 | Park | G06F 3/04883 |
| | | | 345/173 |
| 2016/0306542 A1* | 10/2016 | Melnik | G06F 3/04842 |
| 2016/0317915 A1* | 11/2016 | Onda | A63F 13/2145 |
| 2017/0007921 A1* | 1/2017 | Baba | G06F 3/04842 |
| 2018/0043254 A1* | 2/2018 | Soejima | G06F 3/0488 |
| 2018/0121086 A1* | 5/2018 | Wang | G06F 3/04883 |
| 2018/0161674 A1* | 6/2018 | Kohara | A63F 13/52 |
| 2018/0203602 A1* | 7/2018 | Masuoka | G06F 3/04817 |
| 2018/0318705 A1* | 11/2018 | Moberg | A63F 13/5255 |
| 2019/0129563 A1* | 5/2019 | Ichikawa | G06F 3/0416 |
| 2021/0316210 A1* | 10/2021 | Miyano | A63F 13/2145 |

FOREIGN PATENT DOCUMENTS

| | | |
|---|---|---|
| JP | 2014-89713 A | 5/2014 |
| JP | 2016-116904 A | 6/2016 |
| JP | 2016-126512 A | 7/2016 |
| JP | 2016-171874 A | 9/2016 |
| JP | 2018-29821 A | 3/2018 |

* cited by examiner

For vertical display screen

For horizontal display screen

GAME SYSTEM, PROCESSING METHOD, AND INFORMATION STORAGE MEDIUM

CROSS REFERENCE TO RELATED APPLICATION

This application is a continuation of International Patent Application No. PCT/JP2019/050905, having an international filing date of Dec. 25, 2019, which designated the United States, the entirety of which is incorporated herein by reference. Japanese Patent Application No. 2018-247138 filed on Dec. 28, 2018 is also incorporated herein by reference in its entirety.

BACKGROUND

The disclosure relates to a game system, a processing method, an information storage medium, and the like.

In a game that can be played on a terminal device, such as a smartphone, a tablet PC, or a portable game device, the player performs a touching operation on a touch screen of a touch panel display to input operations for playing a game. For example, the technique disclosed in Japanese Unexamined Patent Application Publication No. 2016-126512 is known as a previously-known technique of a game system that performs a game process based on a touching operation on a touch screen. The game system of Japanese Unexamined Patent Application Publication No. 2016-126512 detects the operation amount and the operation direction in the slide operation input from the reference position to the instruction position of the touching operation input. Then, a process of correcting the operation amount is performed based on the distance from the reference position to the end of the region where the slide operation input is performed. Further, Japanese Unexamined Patent Application Publication No. 2014-89713 discloses a method of setting a virtual input area for a pen-shaped mouse, and moving a mouse pointer displayed in a display device in accordance with the movement of the pen-shaped mouse when the user moves the pen-shaped mouse in the virtual input area.

In recent years, the size of the touch screen of a touch panel display tends to increase. This increase in touch screen size has posed a problem that the player must largely move a finger to touch the entire touch screen.

DESCRIPTION OF EXEMPLARY EMBODIMENTS

Figure 1:
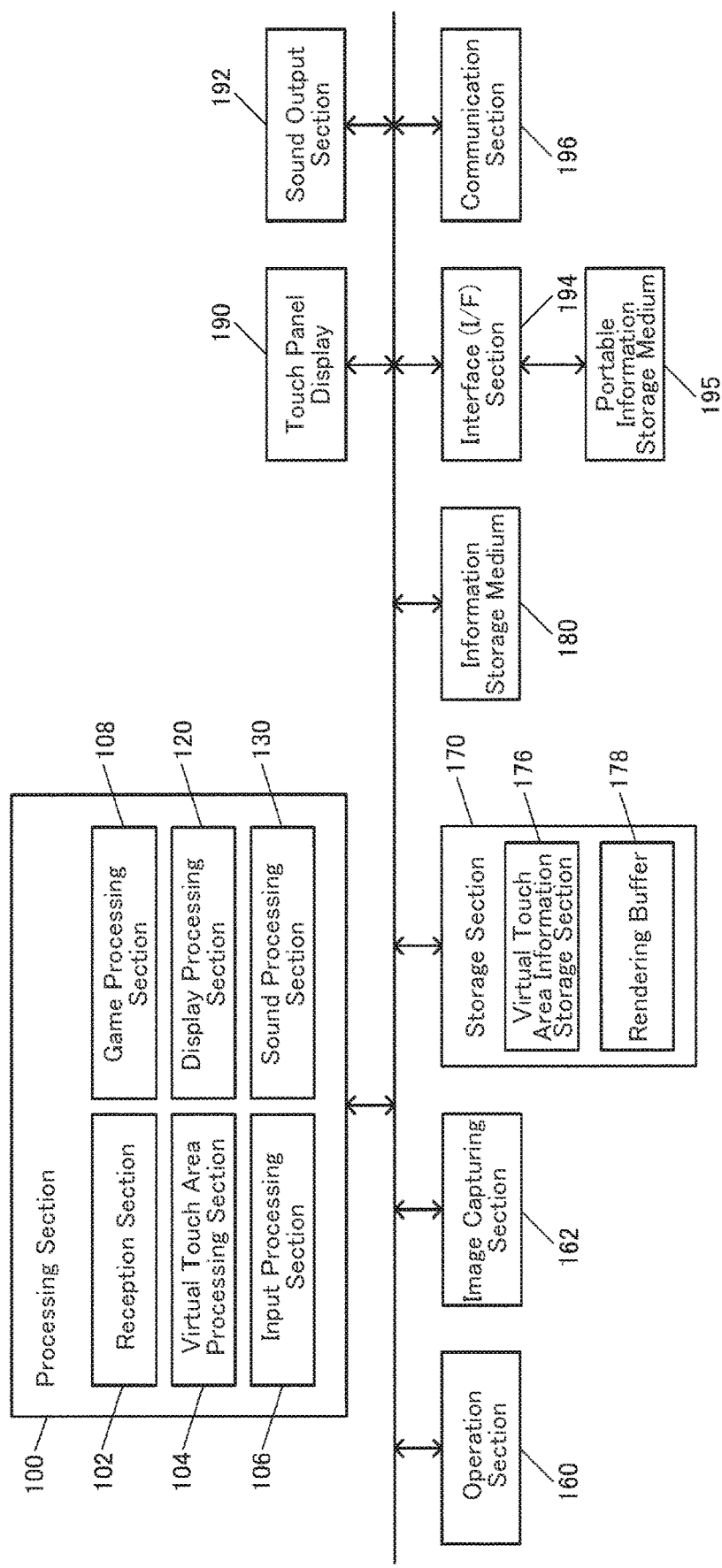
FIG. 1 is a diagram illustrating a configuration example of a game system according to the present embodiment.

The following disclosure provides many different embodiments, or examples, for implementing different features of the provided subject matter. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. Further, when a first element is described as being "connected" or "coupled" to a second element, such description includes embodiments in which the first and second elements are directly connected or coupled to each other, and also includes embodiments in which the first and second elements are indirectly connected or coupled to each other with one or more other intervening elements in between.

Exemplary embodiments are described below. Note that the following exemplary embodiments do not in any way limit the scope of the content defined by the claims laid out herein. Note also that all of the elements described in the present embodiment should not necessarily be taken as essential elements.

1. Game System

FIG. 1 is a block diagram illustrating a configuration example of a game system (terminal device, game device, image generation device) according to the present embodiment. The game system according to the present embodiment is not limited to the structure illustrated in FIG. 1, and can be modified in various ways including omitting some of its components or adding another component.

An operation section 160 is used by a player (user) to input various types of operation input information (input information). The operation section 160 can be implemented by, for example, an operation button, a direction designating key, a joystick, or the like. A touch panel display 190 also serves as the operation section 160.

An image capturing section 162 captures an image of a target object, and is implemented by an image sensor such as a CCD or a CMOS sensor, and an optical system constituted of a focus lens or the like.

A storage section 170 stores therein various types of information. The storage section 170 functions as a work area for a processing section 100, a communication section 196, and the like. The storage section 170 stores a program and data required for executing the program. The function of the storage section 170 can be implemented by a semiconductor memory (DRAM, SRAM, VRAM), a hard disk drive (HDD), a solid state drive (SSD), or the like. The storage section 170 includes a virtual touch area information storage section 176, and a rendering buffer 178. The virtual touch area information storage section 176 stores information regarding a virtual touch area. For example, the virtual touch area information storage section 176 stores information on the position, size, or shape of the virtual touch area. The rendering buffer 178 is, for example, a frame buffer or a work buffer that is capable of storing image information in a unit of pixels.

An information storage medium 180 is a computer-readable medium, and stores a program, data, and the like. The information storage medium 180 can be implemented by an optical disc (DVD, BD, CD), an HDD, a semiconductor memory (ROM), or the like. The processing section 100 performs various processes according to the present embodiment based on a program (data) stored in the information storage medium 180. Thus, the information storage medium 180 stores therein a program for causing a computer (a device including an input device, the processing section, the storage section, and an output section) to function as the sections according to the present embodiment (a program for causing a computer to perform processes of the sections).

The touch panel display 190 outputs an image generated according to the present embodiment, and can be implemented by a liquid crystal display (LCD), an organic electroluminescence display, or the like having a touch panel. For example, the touch panel display 190 can be implemented by a liquid crystal display or an organic electroluminescence display, and a touch panel integrally formed in the display. Examples of touch panel system include a resistance film system (4-wire system, 5-wire system), a capacitive coupling system, an ultrasonic surface acoustic wave system, an infrared scanning system, and the like. The touch panel display 190 is classified into a one-point detection type that can detect only one touch position (contact position) at the same time, and a multiple-point detection type that can detect a plurality of points at the same time. A sound output section 192 outputs sound generated according to the present embodiment, and the function thereof can be implemented by a speaker, a headphone, or the like.

An interface (I/F) section 194 performs an interface process for a portable information storage medium 195. The function of the I/F section 194 can be implemented by an application specific integrated circuit (ASIC) or the like for the I/F process. The portable information storage medium 195 is a storage device that stores various types of information from the player, and holds the information without power supply. The portable information storage medium 195 can be implemented by an integrated circuit (IC) card (memory card), a universal serial bus (USB) memory, a magnetic card, or the like.

The communication section 196 communicates with external apparatuses (other devices) through a wired or wireless network. The function of the communication section 196 can be implemented by a communication ASIC, hardware such as a communication processor, or a communication firmware.

The program (data) for causing the computer to function as the sections according to the present embodiment may be distributed to the information storage medium 180 (or the storage section 170) from an information storage medium of a server (host device) through a network and the communication section 196. The scope of the present embodiment can include such a configuration where the information storage medium of the server is used.

The processing section 100 (processor) performs a reception process, a virtual touch area process, an input process, a game process, a display process, or a sound process based on operation input information from the operation section 160, a program, and the like.

The processes according to the present embodiment performed by sections of the processing section 100 can be implemented by a processor (processor including hardware). For example, the processes according to the present embodiment can be implemented by a processor that operates based on information such as a program and a memory that stores the information such as the program. For example, the processor may implement the functions of the sections in discrete hardware or in integrated hardware. For example, the processor may include hardware, and the hardware may include at least one of a circuit that processes a digital signal and a circuit that processes an analog signal. For example, the processor may include one or a plurality of circuit devices (such as an IC) or one or a plurality of circuit elements (such as a resistor or a capacitor) mounted on a circuit board. For example, the processor may be a central processing unit (CPU). However, the processor is not limited to the CPU, and various processors such as a graphics processing unit (GPU) or a digital signal processor (DSP) may be used. The processor may be a hardware circuit such as an ASIC. The processor may include an amplifier circuit, a filter circuit, or the like that processes an analog signal. The memory (storage section 170) may be a semiconductor memory such as a SRAM or DRAM, or may be a register. Furthermore, the memory may be a magnetic storage device such as a hard disk device (HDD) or may be an optical storage device such as an optical disc device. For example, the memory stores therein a computer-readable command, and the processes of the sections of the processing section 100 are implemented with the processor executing the command. This command may be a set of commands forming a program, or may be a command for instructing an operation to a hardware circuit of the processor.

The processing section 100 includes a reception section 102, a virtual touch area processing section 104, an input processing section 106, a game processing section 108, a display processing section 120, and a sound processing section 130. As described above, the processes according to the present embodiment performed by these sections may be implemented by a processor (or a processor and a memory). Various modifications may be made with some of these components (sections) omitted, or another component added.

The reception section 102 performs a reception process of various types of information such as operation information of the player. The virtual touch area processing section 104 performs various processes in relation to the virtual touch area. The input processing section 106 performs an input process in relation to various types of information such as operation information. The details of the processes performed by these sections are described later.

The game processing section 108 performs various game processes for allowing the player to play the game. Examples of the game processes include a process of starting the game when a game start condition is satisfied, a process of making the started game progress, a process of ending the game when a game end condition is satisfied, and a process of calculating a game score.

The display processing section 120 performs a process of displaying an image in the touch panel display 190. For example, the display processing section 120 performs a rendering process based on the results of various processes performed by the processing section 100 to generate an image, and displays the image in the touch panel display 190. For example, the display processing section 120 performs a rendering process with respect to the rendering buffer 178 to generate a game image. The game image may be a three-dimensional image (pseudo three-dimensional image) or a two-dimensional image.

The sound processing section 130 performs a sound generation process based on the results of various processes performed by the processing section 100. More specifically, the sound processing section 130 generates a song (music, BGM), a sound effect, or a voice and outputs them through the sound output section 192.

The game system according to the present embodiment includes the reception section 102, the virtual touch area processing section 104, the input processing section 106, and the game processing section 108, as illustrated in FIG. 1.

When a touching operation is performed by a player with respect to the touch screen of the touch panel display 190, the reception section 102 performs a process of receiving the coordinates of the touching operation in the touch screen as touching operation coordinates. For example, the coordinates of the position of the touching operation in the touch screen are output from the touch panel display 190. The touch screen is a screen of the touch panel display 190 and serves as a target screen on which the touching operation is performed. The reception section 102 monitors the coordinates of the position of the touching operation, and receives the coordinates of the position of the touching operation when the touching operation is performed as the touching operation coordinates. The touching operation coordinates are, for example, coordinates in the screen coordinate system of the touch screen.

The virtual touch area processing section 104 performs a process of associating the touching operation coordinates in the virtual touch area with mapping coordinates on the touch screen. The virtual touch area is an area set in the touch screen as an area smaller than the touch screen. The virtual touch area has an area of, for example, ½ or less of the area of the touch screen. The virtual touch area is set in, for example, the lower right side or the lower left side of the touch screen. For example, the virtual touch area is set as an area including a lower right corner portion or a lower left corner portion of the touch screen. The virtual touch area processing section 104 performs a process of mapping the touching operation coordinates in the virtual touch area on the mapping coordinates on the touch screen. This mapping process may be performed by a predetermined calculation process, or by using a mapping table, which uses the touching operation coordinates in the virtual touch area as input and uses the mapping coordinates as output.

When the touching operation is performed with respect to the virtual touch area, the input processing section 106 sets the mapping coordinates as input coordinates, assuming that the touching operation is performed with respect to the mapping coordinates associated with the touching operation coordinates in the virtual touch area on which the touching operation is performed. More specifically, in a normal touch panel operation, when a touching operation is performed with respect to the touch screen, the touching operation coordinates, which are the coordinates of the position where the touching operation is performed, are set as the input coordinates. In contrast, in the present embodiment, it is assumed that the touching operation is performed not with respect to the touching operation coordinates that are the coordinates of the position where the touching operation is actually performed, but with respect to the position of the mapping coordinates that are associated with the touching operation coordinates; accordingly, the mapping coordinates are set as the input coordinates. Then, the game processing section 108 performs a game process based on the input coordinates. More specifically, the game process is performed by regarding the mapping coordinates as the input coordinates. For example, the game processing section 108 performs various game processes, such as a game progress process, a selection process for selection items in a menu, an option, or the like, a game command process, a character control process, a game start process, a game end process, or a game score calculation process, based on the input coordinates, which are the mapping coordinates. For example, the game processing section 108 performs a game process using the input coordinates (i.e., mapping coordinates) as operation information. With this operation, the player can perform various operations for playing the game by touching the virtual touch area.

When a touching operation is performed with respect to the virtual touch area, the virtual touch area processing section 104 performs a notification process for notifying the player of the position of the mapping coordinates associated with the touching operation coordinates in the virtual touch area. For example, the virtual touch area processing section 104 performs a notification process for allowing the player to visually recognize the mapping coordinates corresponding to the touching operation coordinates in the virtual touch area. For example, the virtual touch area processing section 104 performs a notification process of displaying a display object, such as an effect, at the position of the mapping coordinates. In this case, an animation process for the object to be displayed, such as an effect, may be performed.

Further, the input processing section 106 sets the mapping coordinates as the input coordinates in a virtual input mode, and sets the touching operation coordinates as the input coordinates in a normal input mode. For example, the virtual input mode is the first input mode and the normal input mode is the second input mode. In the present embodiment, it is possible to switch between a virtual input mode in which the virtual touch area is used as the touching operation area and a normal input mode in which the entire touch screen is used as the touching operation area. When the player performs a touching operation with respect to the virtual touch area in the virtual input mode, various processes such as a game process are performed using the mapping coordinates associated with the touching operation coordinates as the input coordinates. When the player performs a touching operation with respect to a touch screen in the normal input mode, various processes such as a game process are performed using the touching operation coordinates as the input coordinates.

The input processing section 106 switches between the virtual input mode and the normal input mode according to the game status. The game status includes a game progress status, a gameplay status based on the operation history of the player, the game score status such as acquired game points, the game level status, the game map/environment status, or the statuses of characters used by the player in the game. For example, when the game progress status of the player is the first progress status, the input mode is set to the normal input mode; however, when the game is moved from the first progress status to the second progress status, the input mode is switched from the normal input mode to the virtual input mode. As a result, the player is allowed to perform a game operation through a touching operation with respect to the virtual touch area. Further, when it is determined that the player frequently performs the touching operation with respect to the virtual touch area based on the gameplay status such as the operation history of the player, the input mode is switched to the virtual input mode. In this case, such an input mode switching process may be performed by machine learning, such as an AI (Artificial Intelligence) process using a neural network. Alternatively, it is also possible to permit the player to perform game operation input in the virtual input mode when the player achieves a predetermined game score, when the player achieves a predetermined game level, or when the player uses a specific character.

When the touching operation is performed outside the virtual touch area, the input processing section 106 determines that the touching operation performed outside the virtual touch area is "operation input outside the area". More specifically, when the touching operation is performed in an area within the virtual touch area, the mapping coordinates corresponding to the touching operation coordinates are set as input coordinates; however, when the touching operation is performed in an area outside the virtual touch area, there are no mapping coordinates corresponding to the touching operation coordinates. Therefore, such a touching operation performed outside the area is determined as "operation input outside the area", and, for example, various processes, such as a game process, according to operation input outside the area are performed.

For example, the input processing section 106 assigns the operation input outside the area to a predetermined operation performed by the player. For example, the input processing section 106 assigns the operation input outside the area to a predetermined operation performed by the player in the game. With this configuration, when the player performs a touching operation outside the virtual touch area, it is determined that the predetermined operation, to which the operation input outside the area is assigned, has been performed. For example, as described later, the operation input outside the area is assigned to an operation of pausing the game progress, an operation of taking a screenshot, or an operation of switching the game mode. This enables the player to pause the game, take a screenshot of the game image, and switch the game mode by performing the operation input outside the area. It is also possible to assign the operation input outside the area to an operation of activating a special move or skill of the character used by the player. This enables the player to cause the character to perform a special move or skill by performing the operation input outside the area while performing a normal game operation, such as control of the action of the character or menu selection by a touching operation in the virtual touch area.

Further, the predetermined operation assigned to the operation input outside the area may be a combined operation of a plurality of operations. For example, generally, it is determined that the predetermined operation is performed when the player performs a series of a plurality of operations; however, when the player performs the operation input outside the area, the operation is regarded as a shortcut operation of the series of a plurality of operations. For example, when the player needs to perform a series of a plurality of operations for setting options in the option menu, the shortcut operations of the series of a plurality of operations are assigned to the operation input outside the area.

It is also possible to allow the player to freely set the predetermined operation to be assigned to the operation input outside the area, for example, in the option menu in the game. For example, it is possible to allow the player to preset the action in the game when the operation input outside the area is performed.

Further, when the operation input outside the area is performed, the input processing section 106 switches the virtual input mode in which the mapping coordinates are set as the input coordinates to the normal input mode in which the touching operation coordinates are set as the input coordinates. For example, in the virtual input mode, the player performs a game operation by performing a touching operation in the virtual touch area. Then, in this virtual input mode, when the player performs the operation input outside the area by touching an area outside the virtual touch area, the virtual input mode is switched to the normal input mode. As a result, when the player performs a touching operation in the touch screen, the game process is performed in which the touching operation coordinates on the touch screen become the input coordinates.

Further, the game processing section 108 performs a process of pausing the game progress when the operation input outside the area is performed. For example, when the player performs a touching operation in the virtual touch area in the virtual input mode, the game operation is performed and the game proceeds. When the player performs the operation input outside the area in this virtual input mode, the game progress is paused. For example, when the player has to do something other than the gameplay, or when the player wants to take a sufficient time to perform another operation, the game progress can be paused by performing the operation input outside the area. Then, when the operation input outside the area is performed again or when another predetermined operation such as a touching operation in the virtual touch area is performed, the suspended game is restarted.

Further, the game processing section 108 performs a process of generating a screenshot of the game image when the operation input outside the area is performed. For example, when the player performs a touching operation in the virtual touch area in the virtual input mode, the game proceeds, and when the player performs the operation input outside the area when the game image is displayed in the touch screen, a screenshot of the current game image (game screen) is generated. This enables the player to take a screenshot by performing a simple operation, i.e., the operation input outside the area, while the game is being in progress.

In addition, when a touching operation is performed in the virtual touch area, the game processing section 108 performs a first game process by using the mapping coordinates as input coordinates. In contrast, when the operation input outside the area is performed, a second game process, which is different from the first game process, is performed using the touching operation coordinates outside the area as the input coordinates. In this manner, the game operation in the first game process is performed by the touching operation in the virtual touch area, so that the game proceeds. In contrast, when the operation input outside the area is performed by the player, the game operation in the second game process different from the first game process is performed using the touching operation coordinates outside the area as the input coordinates, so that the game proceeds.

Further, the virtual touch area processing section 104 performs a process of changing the position, size, or shape of the virtual touch area in the touch screen. For example, a process of changing the position of the virtual touch area in the screen coordinate system of the touch screen, the size of the virtual touch area, the shape of the boundary of the virtual touch area, or the like, is performed. For example, it is arranged such that the player can change the position, size, or shape of the virtual touch area. For example, the position, size, or shape of the virtual touch area is changed according to the setting of the player on the option setting menu or the like. For example, when the player performs setting input for his/her dominant arm, the position, size, or shape of the virtual touch area is changed according to the setting input for the dominant arm. For example, when the player is right-handed, the position of the virtual touch area is changed to fit for a right-handed person; when the player is left-handed, the position of the virtual touch area is changed to fit for a left-handed person. Alternatively, it is also possible to enlarge or reduce the size of the virtual touch area based on the setting input by the player, or change the shape of the virtual touch area according to the setting input. It may also be arranged such that, when the predetermined change condition is satisfied, the position, size, or shape of the virtual touch area in the touch screen is changed. For example, when the screen display is switched from vertical display to horizontal display or switched from horizontal display to vertical display as a result of detection of the orientation of the terminal device in which the game system is performed, it is determined that the predetermined change condition is satisfied and the position, size, or shape of the virtual touch area in the touch screen is changed.

Further, the virtual touch area processing section 104 changes the virtual touch area according to the game status. For example, the virtual touch area processing section 104 changes the position, size, or shape of the virtual touch area according to the game progress status, the gameplay status based on the operation history of the player, the game score status, the game level status, the game map/environment status, or the statuses of characters used by the player in the game. For example, in a game status in which a detailed game operation is required, the size of the virtual touch area is increased, and in a game status in which the game can be played by a rough operation, the size of the virtual touch area is reduced. It is also possible to set the position of the virtual touch area to fit for the operation history of the player, or set the size of the virtual touch area according to the operation history of the player. Alternatively, it is also possible to change the size or shape of the virtual touch area depending on whether the game score of the player is low or high or whether the game level of the player is low or high. Alternatively, it is also possible to change the position, size, or shape of the virtual touch area according to the types or sizes of the characters used by the player.

Further, after the touching operation is performed on the virtual touch area, the input processing section 106 sets the mapping coordinates corresponding to the touching operation coordinates at the timing when the touching operation part of the player leaves the touch screen as the input coordinates. For example, when the touching operation is performed on the virtual touch area, the touching operation coordinates at the timing are not used; instead, the mapping coordinates corresponding to the touching operation coordinates at the timing when the touching operation part such as a finger or the like of the player leaves the touch screen are used as the input coordinates in executing the game process. In this case, for example, the mapping coordinates corresponding to the touching operation coordinates at the timing when the touching operation part leaves the touch screen are stored in the storage section 170 (virtual touch area information storage section 176). Thereafter, it is possible to set the mapping coordinates stored in the storage section 170 as the input coordinates by a predetermined operation of the player, such as re-tapping.

The virtual touch area processing section 104 also performs identification display of the virtual touch area in the touch screen. For example, identification display of the virtual touch area is performed so that the player can visually recognize the boundary or the like of the virtual touch area. For example, it is possible to draw a predetermined type of line on the boundary of the virtual touch area, or display a display object such as a marker to enable the player to recognize the boundary of the virtual touch area. Alternatively, it is possible to perform identification display in which the virtual touch area has a color tone and a luminance different from those in other regions in the touch screen.

2. Method According to the Present Embodiment

Next, a method according to the present embodiment will be described in detail. The following describes a case where a smartphone is mainly used as an example of the terminal device to which the game system of the present embodiment is applied; however, the terminal device to which the game system of the present embodiment is applied is not limited to the smartphone and may be a portable game device, a portable communication terminal such as a tablet PC, or the like.

2.1 Virtual Touch Area

Figure 2:
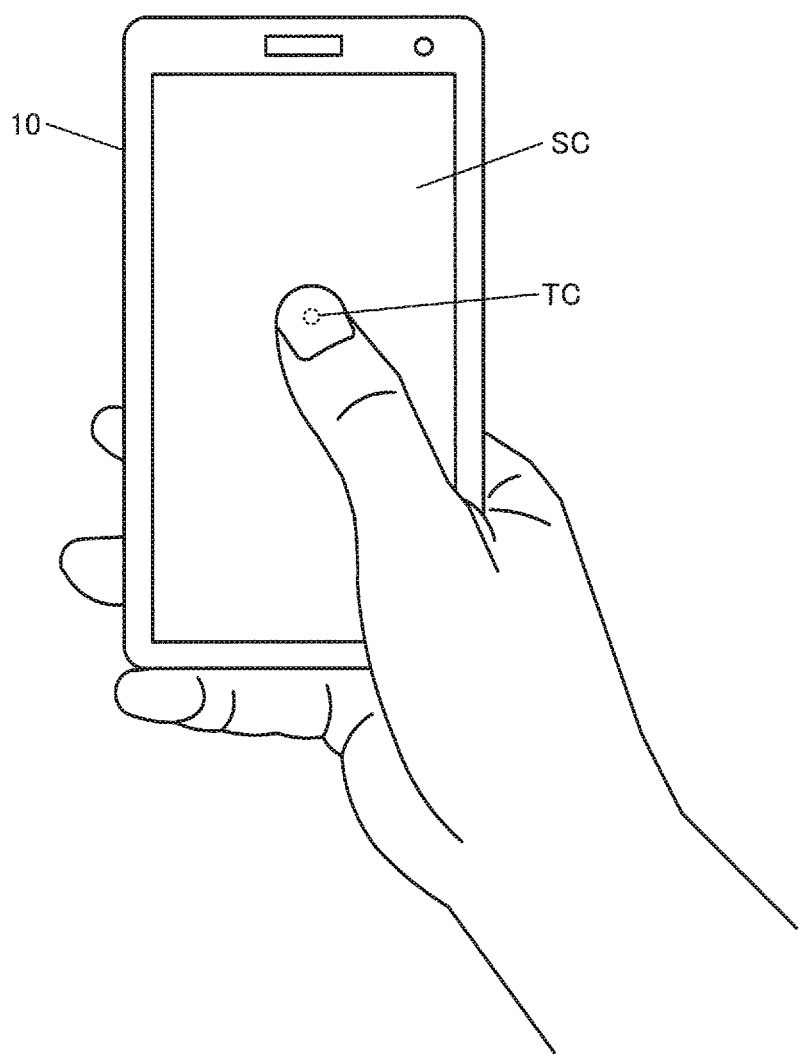
FIG. 2 is an explanatory view showing a problem of a touching operation on a large-size touch screen.

In FIG. 2, the player plays a game while holding a terminal device 10, such as a smartphone, in his/her right hand. The terminal device 10 includes a touch panel display 190, and the player performs a game operation by touching a touch screen SC of the touch panel display 190. Specifically, in FIG. 2, the player extends his/her thumb and touches the vicinity of the center of the touch screen SC. For example, in the case that a player plays a game in a train, it is necessary to perform a touching operation as shown in FIG. 2 with his/her right hand while holding a strap in the train with his/her left hand, which makes the game operation difficult. In particular, in recent years, the size of the touch screen SC of the touch panel display 190 tends to increase. This increase in size of the touch screen SC has posed a problem that the player has to move his/her finger largely in order to touch the entire part of the touch screen. As a solution to this problem, for example, an easy access function has been known. The function works such that the screen display is lowered by double-tapping the home button, thus allowing the player to easily touch the upper portion, which is usually difficult to touch. This easy access function, however, requires a complicated operation in use and also poses a problem that the player cannot touch the lower part of the screen when the easy access function is used, as the lower part is hidden by the function.

Figure 3:
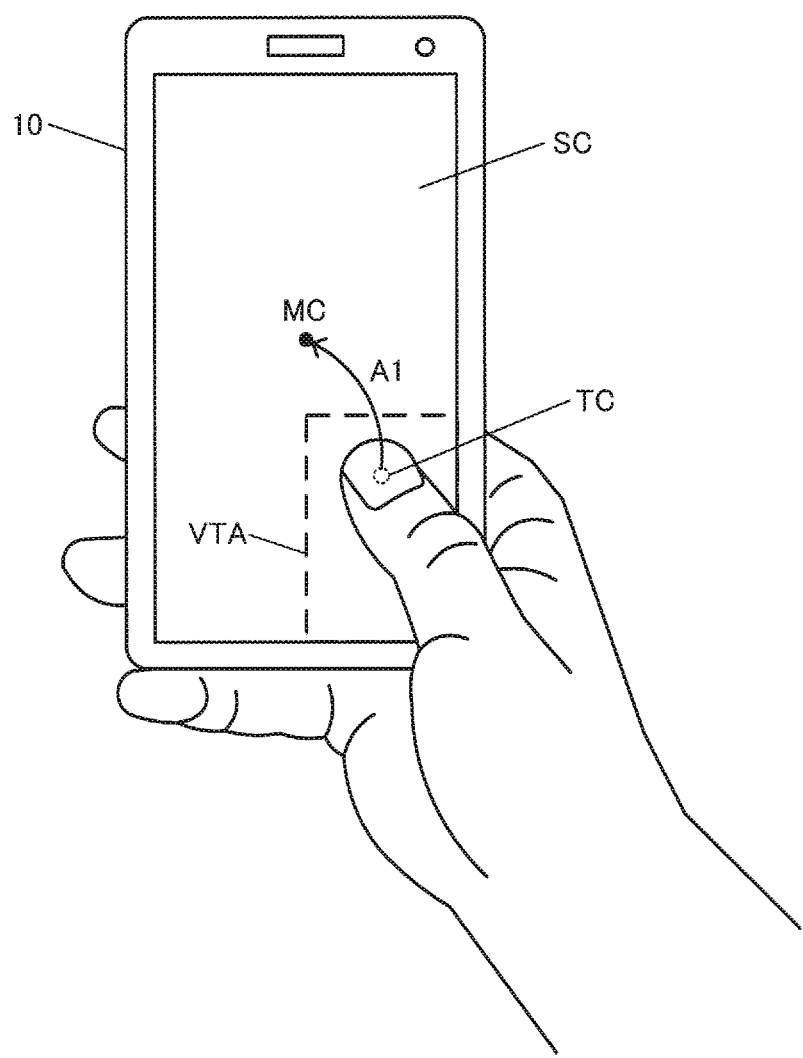
FIG. 3 is an explanatory view of a touching operation on a virtual touch area.

Therefore, in the present embodiment, as shown in FIG. 3, a virtual touch area VTA is set in the touch screen SC of the terminal device 10. The terminal device 10 is a terminal device for implementing the game system of the present embodiment shown in FIG. 1. The terminal device 10 is, for example, a smartphone, a portable game device, or a tablet PC. The virtual touch area VTA is set in the touch screen SC and its size is smaller than that of the touch screen SC. The virtual touch area VTA is set as a virtual area different from the normal touch area of the touch screen SC. In FIG. 3, the virtual touch area VTA is positioned in the lower right portion of the touch screen SC. For example, when the player is right-handed, the game operation is believed to be performed with the right hand; therefore, it is desirable to set the virtual touch area VTA in the lower right portion of the touch screen SC as illustrated. In contrast, when the player is left-handed, the game operation is believed to be performed with the left hand; therefore, it is desirable to set the virtual touch area VTA in the lower left portion of the touch screen SC.

When the player performs a touching operation with respect to the touch screen SC, the game system of the present embodiment receives the coordinates on the touch screen SC on which the touching operation is performed as touching operation coordinates TC. More specifically, the coordinates of the touching operation position are acquired as the touching operation coordinates TC. The touching operation coordinates TC are, for example, coordinates in the screen coordinate system of the touch screen SC. In one example, the origin of the screen coordinate system is set in a lower right portion or the lower right corner of the touch screen SC.

In the present embodiment, as indicated by A1 in FIG. 3, a process of associating the touching operation coordinates TC in the virtual touch area VTA with mapping coordinates MC on the touch screen SC is performed. For example, a mapping process for converting the touching operation coordinates TC in the virtual touch area VTA into the mapping coordinates MC is performed.

Then, as shown in FIG. 3, when a touching operation using a finger such as a thumb is performed on the virtual touch area VTA, it is determined that the touching operation is performed with respect to the mapping coordinates MC corresponding to the touching operation coordinates TC in the virtual touch area VTA in which the touching operation is performed, and the mapping coordinates MC are set as the input coordinates. Then, the game process is performed based on the input coordinates. More specifically, operation information corresponding to the mapping coordinates MC, which are the input coordinates, is input, thereby executing various game processes.

Figure 4:
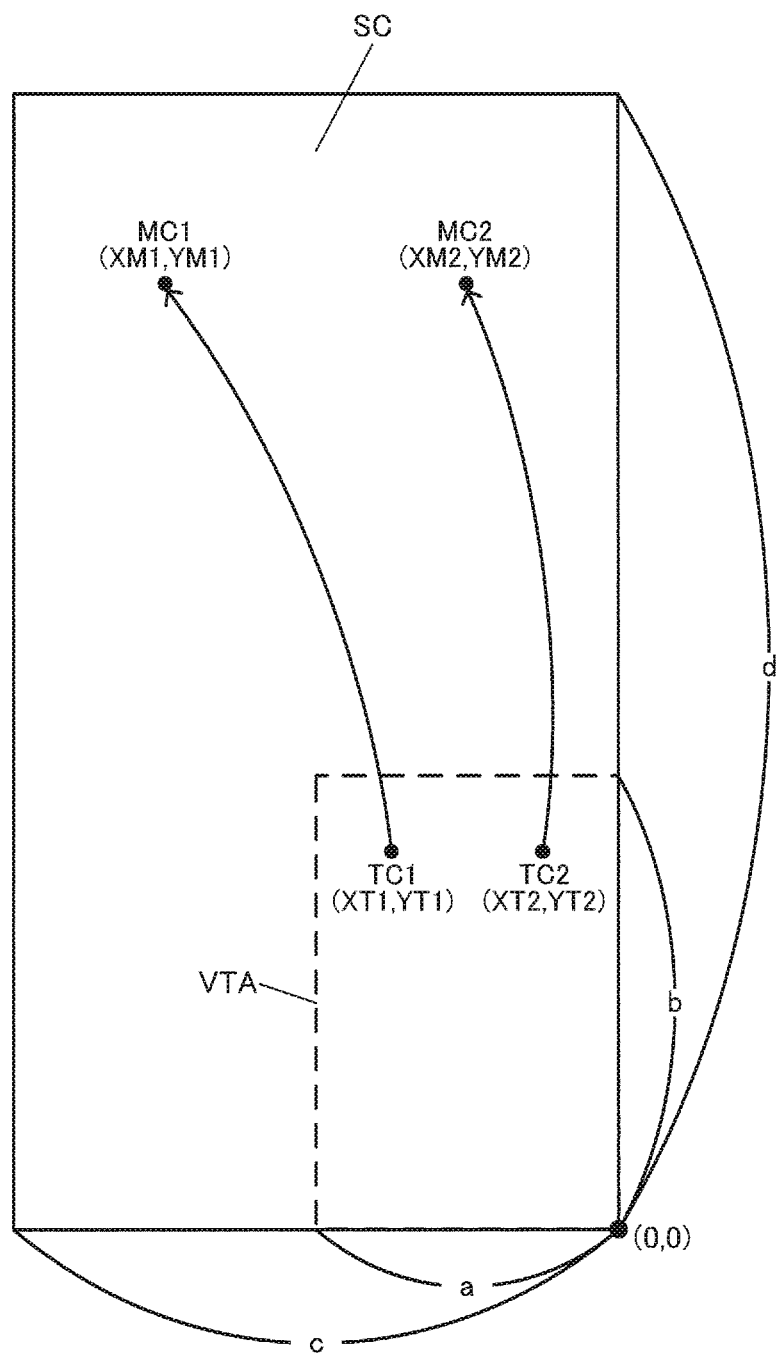
FIG. 4 is an explanatory view of a process for associating touching operation coordinates with mapping coordinates.

FIG. 4 is an explanatory view of a process for associating touching operation coordinates with mapping coordinates. In FIG. 4, touching operation coordinates TC1 of the virtual touch area VTA are associated with mapping coordinates MC1, and touching operation coordinates TC2 are associated with mapping coordinates MC2. More specifically, the touching operation coordinates TC1 and TC2 in the virtual touch area VTA are mapped as the mapping coordinates MC1 and MC2. For example, if assuming that the length in the X direction (the horizontal direction) and the length in the Y direction (the vertical direction) of the virtual touch area VTA are represented by a and b, respectively, and the length in the X direction and the length in the Y direction of the touch screen SC are represented by c and d, respectively, a and b serve as parameters representing the size of the virtual touch area VTA, and c and d serve as parameters representing the size of the touch screen SC. Further, the lower right corner portion of FIG. 4 is referred to as the coordinate origin (0, 0), and the X and Y coordinates of the touching operation coordinates TC1 are referred to as XT1 and YT1, respectively, and the X and Y coordinates of the touching operation coordinates TC2 are referred to as XT2 and YT2, respectively. Further, the X and Y coordinates of the mapping coordinates MC1 are referred to as XM1 and YM1, respectively, and the X and Y coordinates of the mapping coordinates MC2 are referred to as XM2 and YM2, respectively. In this case, the touching operation coordinates TC1 and TC2 are converted into the mapping coordinates MC1 and MC2, for example, by the following conversion formulas (1), (2), (3), and (4).

$$XM1 = (c/a) \times XT1 \quad (1)$$

$$YM1 = (d/b) \times YT1 \quad (2)$$

$$XM2 = (c/a) \times XT2 \quad (3)$$

$$YM2 = (d/b) \times YT2 \quad (4)$$

In this case, the touching operation coordinates TC1 and TC2 can be converted into the mapping coordinates MC1 and MC2 by using the parameters a and b representing the size of the virtual touch area VTA and the parameters c and d representing the size of the touch screen SC. For example, the size of the virtual touch area VTA provided in the touch screen SC is set by the parameters a and b. Then, the parameters c and d are set based on the screen size of the terminal device 10 used by the player. In this manner, the touching operation coordinates TC1 and TC2 can be converted into the mapping coordinates MC1 and MC2 by the conversion formulas (1) to (4).

The process of associating the touching operation coordinates within the virtual touch area with the mapping coordinates is not limited to those using the conversion formulas (1) to (4). For example, the process of associating the touching operation coordinates with the mapping coordinates may be performed using calculation formulas other than the formulas (1) to (4). Alternatively, a mapping table in which the touching operation coordinates serve as input and the mapping coordinates serve as output may be used, and the process of associating the touching operation coordinates with the mapping coordinates may be performed using this mapping table.

Further, in the present embodiment, the game process is performed by using the mapping coordinates, which are associated with the touching operation coordinates on the touch screen, as the input coordinates.

Figure 5:
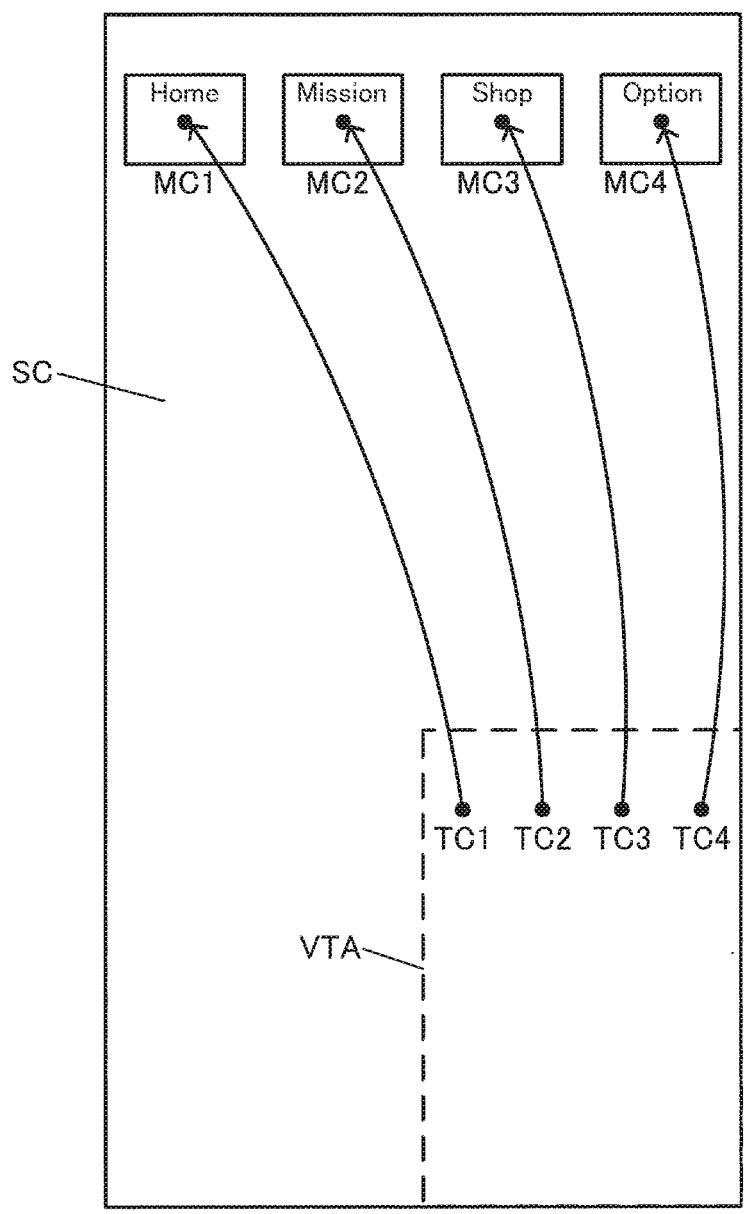
FIG. 5 is an explanatory view of an example of a game process using mapping coordinates as input coordinates.

For example, in FIG. 5, a game process for selecting a game menu is performed using the mapping coordinates as input coordinates. Specifically, in FIG. 5, the touching operation coordinates TC1, TC2, TC3, TC4 in the virtual touch area VTA are associated with the mapping coordinates MC1, MC2, MC3, MC4, respectively. A game menu icon is displayed at each position of the mapping coordinates MC1, MC2, MC3, MC4. Specifically, the menu icons of home, mission, shop, and option are displayed. Accordingly, when the player touches the position of the touching operation coordinates TC1 in the virtual touch area VTA, the mapping coordinates MC1 associated with the touching operation coordinates TC1 are regarded as serving as the input coordinates, thereby enabling the player to select the home menu icon. More specifically, the touching operation on the position of the touching operation coordinates TC1 is regarded as a touching operation on the position of the mapping coordinates MC1, and the home menu icon is selected. Similarly, when the player touches the position of the touching operation coordinates TC2, TC3, or TC4, the mapping coordinates MC2, MC3, or MC4 associated with the touching operation coordinates TC2, TC3, or TC4 are regarded as serving as the input coordinates, thereby enabling the player to select the menu icon of mission, shop, or option.

It is also possible to perform a game process of processing a command using the mapping coordinates as input coordinates. For example, a command icon for selecting a command is displayed on the touch screen SC. When the touching operation coordinates in the virtual touch area VTA corresponding to the mapping coordinates where the command icon is located are touched, it is determined that the command icon is selected, and a command corresponding to the command icon is executed. In this manner, it becomes possible to execute a desired command by allowing the player to select the command using the mapping coordinates as input coordinates.

Figure 6:
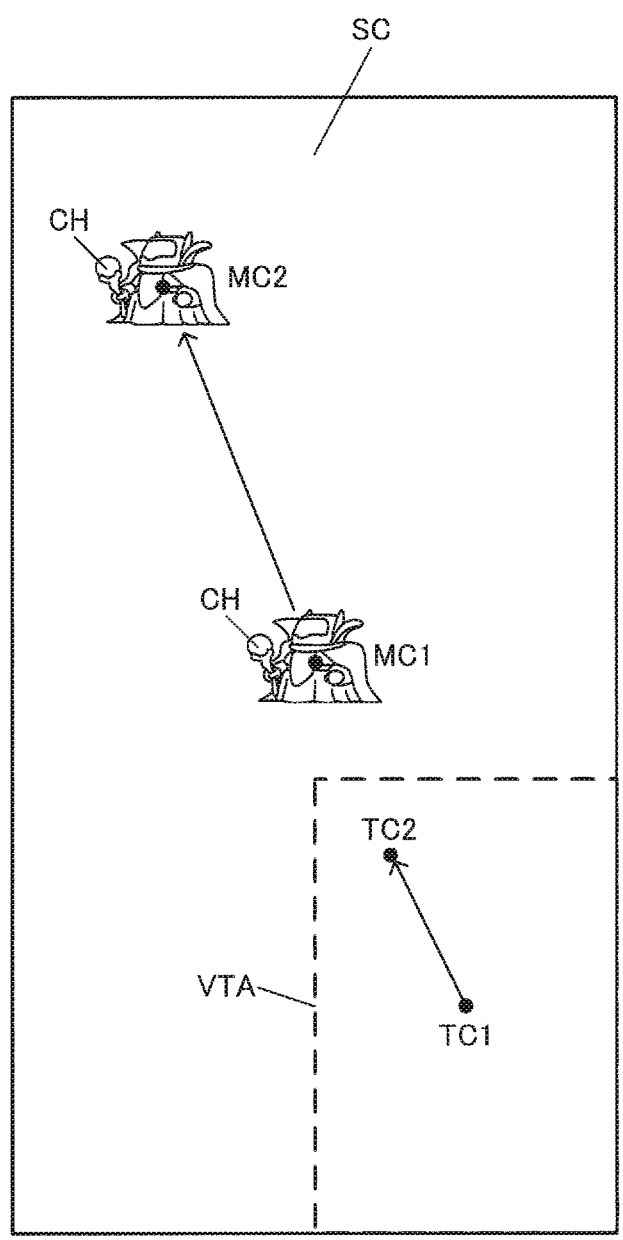
FIG. 6 is an explanatory view of an example of a game process using mapping coordinates as input coordinates.

Further, in FIG. 6, a game process for action control of a character CH operated by the player is performed using the mapping coordinates as the input coordinates; more specifically, a game process for movement control is performed. For example, in FIG. 6, the touching operation coordinates TC1 and TC2 in the virtual touch area VTA are associated with the mapping coordinates MC1 and MC2. Further, the player touches the position of the touching operation coordinates TC1 and drags it toward the position of the touching operation coordinates TC2. As a result, the character CH at the position of the mapping coordinates MC1 corresponding to the touching operation coordinates TC1 moves to the position of the mapping coordinates MC2 corresponding to the touching operation coordinates TC2. More specifically, the game process for movement control of the character CH operated by the player is performed using the mapping coordinates MC1 and MC2 as the input coordinates.

Figure 7:
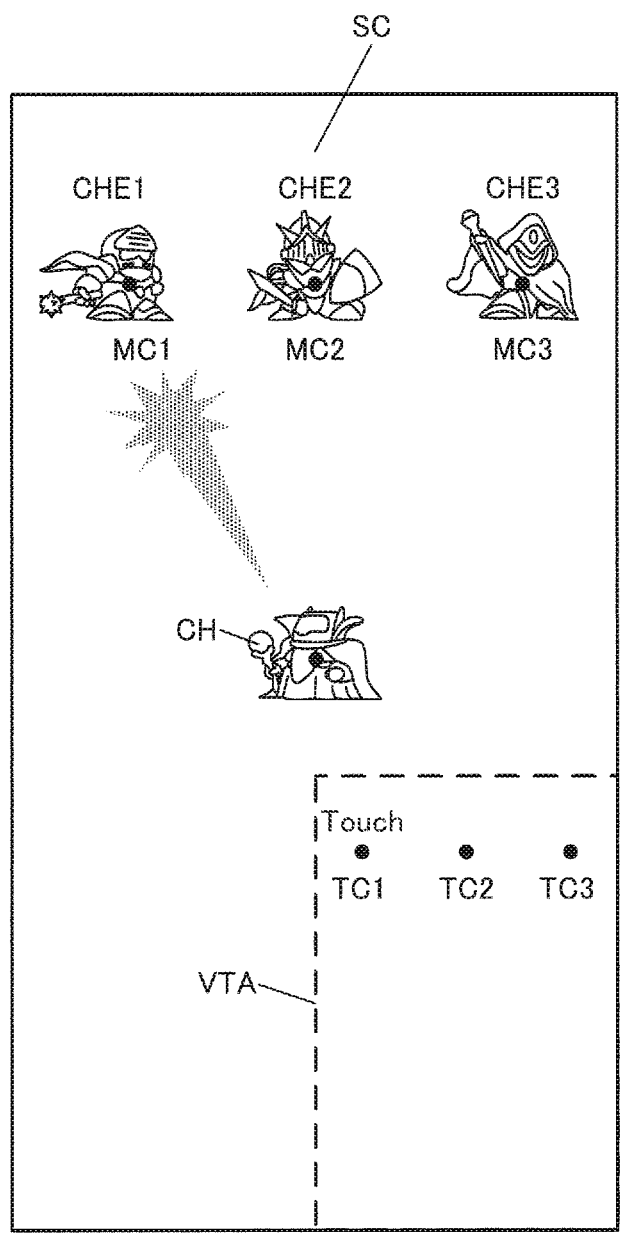
FIG. 7 is an explanatory view of an example of a game process using mapping coordinates as input coordinates.

Further, in FIG. 7, a game process for action control of the character CH operated by the player is performed using the mapping coordinates as the input coordinates; more specifically, a game process for aggressive action is performed. For example, in FIG. 7, the touching operation coordinates TC1, TC2, TC3 in the virtual touch area VTA are associated with the mapping coordinates MC1, MC2, MC3, respectively. In the mapping coordinates MC1, MC2, and MC3, enemy characters CHE1, CHE2, and CHE3 are disposed, respectively. The player selects the enemy character CHE1 as the attack target by touching the position of the touching operation coordinates TC1. This causes the player character CH to attack the enemy character CHE1. More specifically, a game process for allowing the character CH operated by the player to take an aggressive action is performed using the mapping coordinates MC1 as the input coordinates.

As described above, the present embodiment enables various game processes, such as the menu selection process, the command process, the process for action control of the character used by the player, or the game progress process by using the mapping coordinates corresponding to the touching operation coordinates in the virtual touch area VTA as the input coordinates.

Further, in the present embodiment, when a touching operation is performed with respect to the virtual touch area, a notification process of notifying the player of the position of the mapping coordinates associated with the touching operation coordinates within the virtual touch area is performed.

Figure 8:
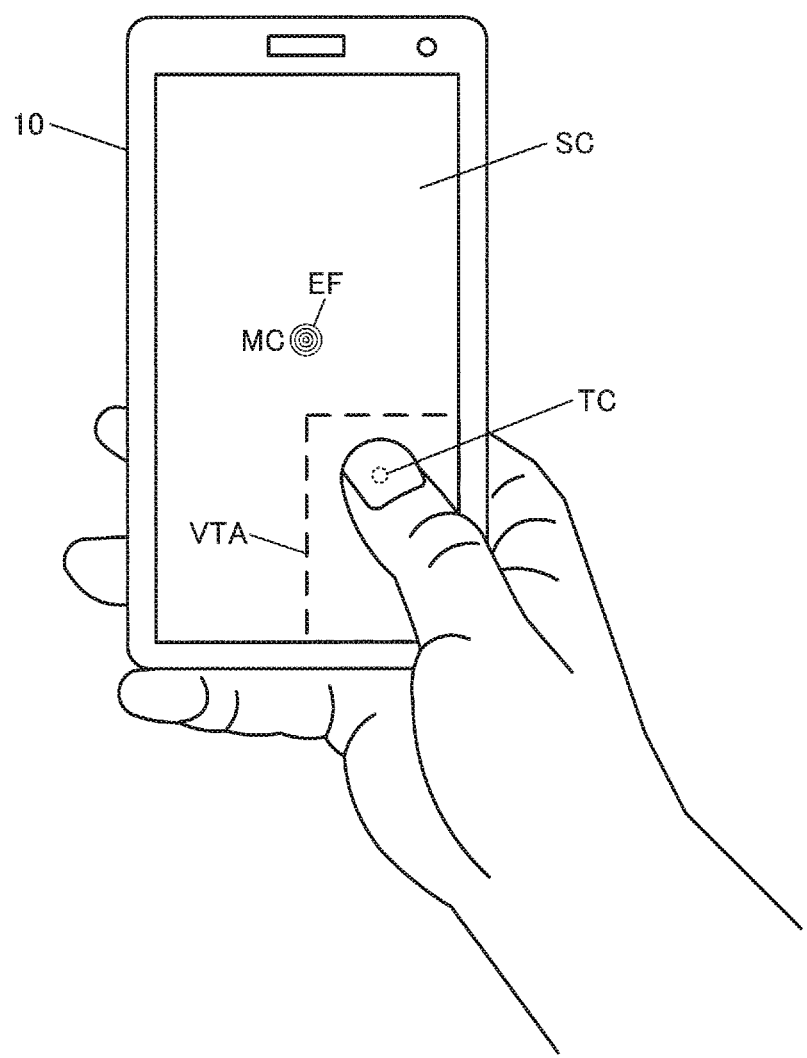
FIG. 8 is an explanatory view of a notification process for notifying a player of the position of mapping coordinates.

For example, in FIG. 8, the player is touching the touching operation coordinates TC in the virtual touch area VTA with a finger. Since the touching operation coordinates TC are associated with the mapping coordinates MC, an effect EF is displayed at the position of the mapping coordinates MC. The effect EF is a display object for allowing the player to recognize the position of the mapping coordinates MC. For example, the effect EF has a form of ripples. By displaying the effect EF, the notification process for allowing the player to visually recognize the position of the mapping coordinates MC associated with the touching operation coordinates TC in the virtual touch area VTA can be performed. The effect for enabling such a notification process is not limited to the ripple-shaped display object as shown in FIG. 8, and various effects may be used. For example, an effect display in which a display object such as a star or a bubble is generated from the position of the mapping coordinates MC may be used. The notification process is not limited to the notification process using an effect. For example, the notification process may be performed by displaying texts or a speech bubble indicating X, Y coordinates of the mapping coordinates at the position of the mapping coordinates MC.

Figure 9:
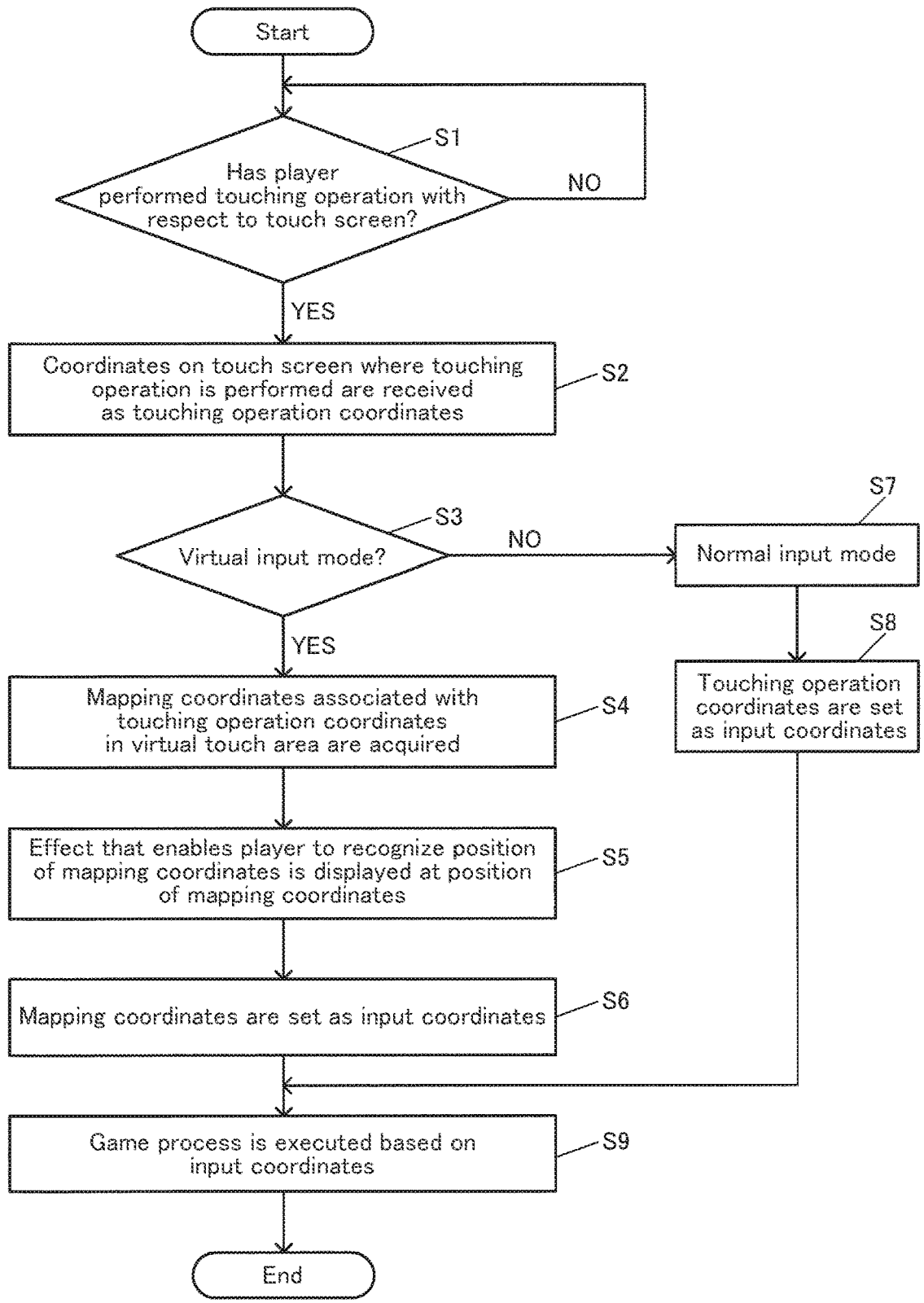
FIG. 9 is a flowchart for explaining processes of the present embodiment.

FIG. 9 is a flowchart explaining a process example according to the present embodiment. First, it is determined whether or not the player has performed a touching operation with respect to the touch screen (step S1). The determination as to whether or not a touching operation is performed with respect to the touch screen is performed, for example, by monitoring output information of the touch panel display 190. Then, the information of the coordinates on the touch screen where the touching operation is performed is received as the touching operation coordinates (step S2). For example, when the touch panel display 190 outputs the information of touching operation coordinates, the reception section 102 acquires and receives the information of touching operation coordinates from the touch panel display 190.

Next, it is determined whether the input mode is the virtual input mode (step S3). More specifically, it is determined whether or not the input mode is the virtual input mode in which not the touching operation coordinates but the mapping coordinates associated with the touching operation coordinates are set as the input coordinates. If the input mode is the virtual input mode, the mapping coordinates associated with the touching operation coordinates in the virtual touch area are acquired (step S4). For example, as described with reference to FIG. 4, the mapping coordinates associated with the touching operation coordinates received in step S2 are acquired by using, for example, the above formulas (1) to (4). Then, an effect that enables the player to recognize the position of the mapping coordinates is displayed at the position of the mapping coordinates (step S5). For example, as shown in FIG. 8, the effect EF having a shape of ripples or the like is displayed at the position of the mapping coordinates MC. Further, the mapping coordinates are set as the input coordinates (step S6). For example, the mapping coordinates are set as the input coordinates in the game operation. Then, the game process is executed based on the input coordinates (step S9). For example, as described with reference to FIGS. 5 to 7, various game processes, including a menu selection process, a command process, a character action control process, and a game progress process, are performed based on the input coordinates that are mapping coordinates.

In contrast, when it is determined in step S3 that the input mode is not the virtual input mode, it is determined that the input mode is the normal input mode, and the touching operation coordinates are set as the input coordinates (steps S7 and S8). Then, the game process is executed based on the input coordinates (step S9). As described above, in the present embodiment, the mapping coordinates are set as the input coordinates in the virtual input mode, and the touching operation coordinates are set as the input coordinates in the normal input mode.

As described above, in the present embodiment, when a touching operation is performed with respect to the touch screen, information of the touching operation coordinates at which the touching operation is performed is received. When the touching operation is performed with respect to the virtual touch area, the mapping coordinates associated with the touching operation coordinates in the virtual touch area are set as the input coordinates, and the game process is performed based on the input coordinates that are the mapping coordinates. More specifically, when the player performs a touching operation with respect to the virtual touch area set on the touch screen as an area smaller than the touch screen, it is determined that the touching operation is performed with respect to the mapping coordinates associated with the touching operation coordinates; as a result, a game process is performed using the mapping coordinates as input coordinates. Accordingly, the player can perform a game operation or the like by a touching operation using the virtual touch area smaller than the touch screen. More specifically, in the present embodiment, the virtual touch area smaller than the entire size of the touch screen is set in the touch screen; then, when a touching operation is performed in the virtual touch area, it is assumed that the touching operation is performed somewhere in the touch screen. With this configuration, the movement range of the touching operation part, such as a finger, is limited to the range necessary for touching the virtual touch area. As a result, the player does not have to largely move the touching operation part, thereby improving the convenience of the player. For example, even in the case of a large-sized touch screen, the player can perform the game operation without largely moving the touching operation part, such as a finger. As a result, it becomes possible to provide an operation interface environment suitable for a terminal device equipped with a touch panel display.

Further, in the present embodiment, as shown in FIG. 8, when a touching operation is performed with respect to the virtual touch area, a notification process of notifying the player of the position of the mapping coordinates associated with the touching operation coordinates is performed.

By performing such a notification process for allowing the player to recognize the position of the mapping coordinates, when the player touches a desired position in the virtual touch area, the player can confirm the position of the mapping coordinates corresponding to the touched position, thus allowing the player to perform a game operation while confirming the position. As a result, the operation interface environment can be improved and the convenience of the player can also be improved.

2.2 Switching Input Mode

Figure 10:
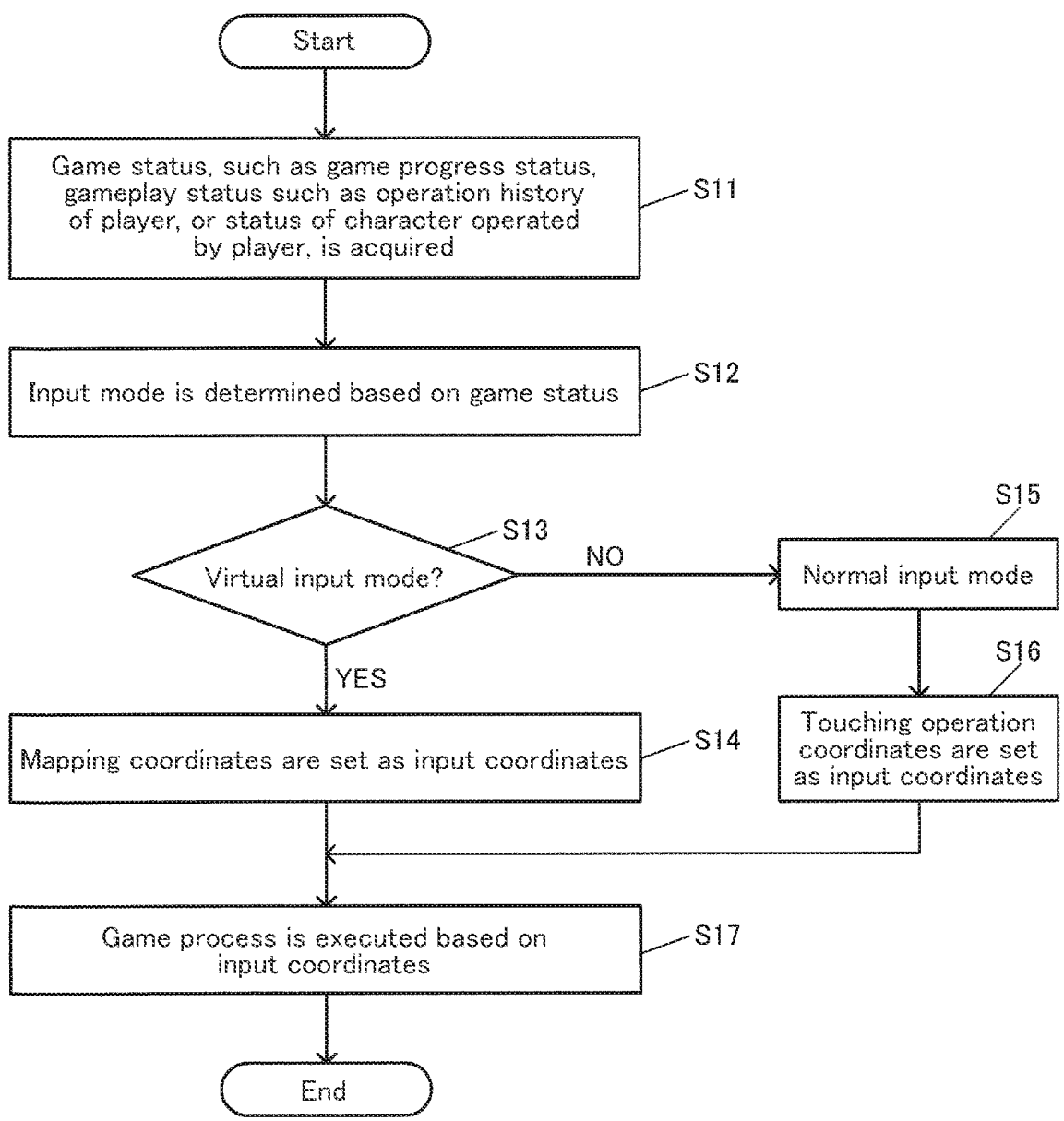
FIG. 10 is a flowchart for explaining a process of switching an input mode.

In the present embodiment, a process of switching between the virtual input mode and the normal input mode is performed. Specifically, the virtual input mode and the normal input mode are switched according to the game status. In the virtual input mode, the mapping coordinates are set as the input coordinates. In the normal input mode, the touching operation coordinates are set as the input coordinates. FIG. 10 is a flowchart for explaining a process of switching an input mode.

First, the game status, such as the game progress status, the gameplay status such as the operation history of the player, or the statuses of the characters operated by the player is acquired (step S11). For example, the game status is determined according to various game processes in the game processing section 108. Next, the input mode is determined based on the game status (step S12). If it is determined that the input mode is set to the virtual input mode based on the game status, the mapping coordinates associated with the touching operation coordinates are set as the input coordinates (steps S13 and S14). Then, the game process is executed based on the input coordinates, which are the mapping coordinates (step S17). In contrast, when it is determined that the normal input mode is set as the input mode based on the game status, the touching operation coordinates are set as the input coordinates (steps S13, S15, S16). Then, the game process is executed based on the input coordinates, which are the touching operation coordinates (step S17).

As described above, in the present embodiment, two input modes, i.e., the virtual input mode and the normal input mode are provided. In the virtual input mode, the mapping coordinates are set as the input coordinates. In the normal input mode, the touching operation coordinates are set as the input coordinates. Then, the game process based on the input coordinates is performed. In this way, by providing two input modes, such as the virtual input mode and the normal input mode, a suitable input mode can be set according to various statuses, such as the game status, thereby enabling the player to play appropriate game operations. For example, if a game operation using the narrow virtual touch area is more preferable according to the status, the input mode is set to the virtual input mode. In this way, even if the touch screen has a large area, the player can perform the game operation using, for example, only a finger of his/her dominant arm; as a result, the convenience of the player can be improved. In contrast, when it is preferable to perform the game operation using the entire touch screen, the input mode is set to the normal input mode. For example, when an appropriate game operation or accurate game operation cannot be performed in the narrow virtual touch area, the normal input mode is selected. Selecting the normal input mode allows the player to perform a game operation using the entire touch screen; as a result, the player can perform appropriate game operations and accurate game operations.

Further, in the present embodiment, the virtual input mode and the normal input mode are switched according to the game status as explained in FIG. 10. For example, the virtual input mode and the normal input mode are switched according to the game status, such as a game progress status, a gameplay status based on the operation history of the player, the game score status such as acquired game points, the game level status, the game map/environment status, or the statuses of characters used by the player in the game. For example, in the first game status, the input mode is set to the virtual input mode, and a game process based on the mapping coordinates is performed. In contrast, in the second game status, the input mode is set to the normal input mode, and a game process based on the touching operation coordinates is performed. For example, when the virtual input mode becomes more suitable as the game operation input than the normal input mode as a result of progress of the game, the input mode is switched from the normal input mode to the virtual input mode. Alternatively, when the monitoring of the operation history of the player indicates that the player frequently touches, for example, the lower right region of the touch screen, it is determined that the player desires a game operation using the virtual touch area provided in the lower right region of the touch screen; accordingly, the normal input mode is switched to the virtual input mode. This determination process may be performed by machine learning using AI or the like. Further, when the game score of the player reaches a predetermined point or when the player achieves a predetermined game level, the player may be granted a game operation in the virtual input mode as a reward. More specifically, the normal input mode is switched to the virtual input mode so that the game operation in the virtual input mode can be performed. Further, the virtual input mode and the normal input mode may be switched according to the status of a character operated by the player. For example, when the character moves, or in a battle scene of the character, the input mode is set to the virtual input mode; on the other hand, when the character is equipped with a weapon or an item, or in a menu screen showing the status of the character, the input mode is set to the normal input mode. It may also be set inversely so that the normal input mode is selected when the character moves or in a battle scene of the character, and the virtual input mode is selected in a menu screen.

2.3 Operation Input Outside the Area

Figure 11:
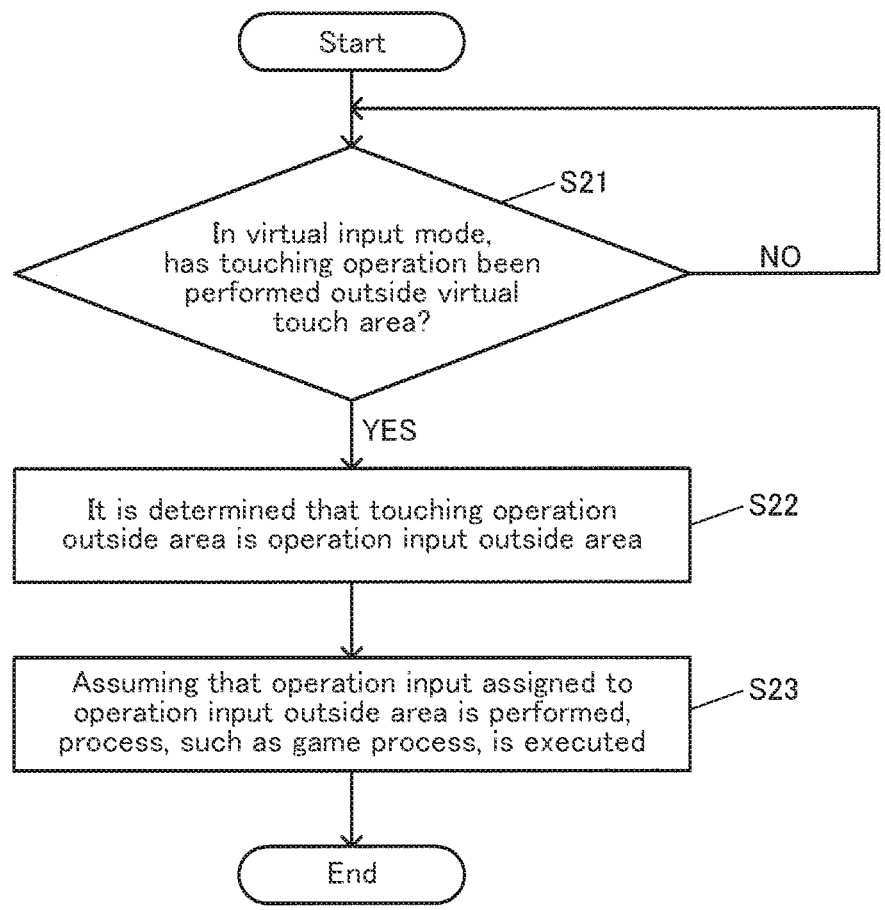
FIG. 11 is a flowchart for explaining a process for operation input outside the area.

In the present embodiment, when the touching operation is performed outside the virtual touch area, the touching operation performed outside the virtual touch area is defined as operation input outside the area. For example, the operation input outside the area is assigned to a predetermined operation performed by the player; then, when the operation input outside the area is performed, it is determined that the predetermined operation is performed. Then, a process, such as a game process, according to the predetermined operation is executed. FIG. 11 is a flowchart for explaining a process for operation input outside the area.

First, in the virtual input mode, it is determined whether or not a touching operation is performed outside the virtual touch area (step S21). For example, the touching operation coordinates of the virtual touch area are monitored, and it is determined whether the touching operation coordinates are located outside the virtual touch area. Then, when the touching operation is performed outside the virtual touch area, it is determined that the touching operation outside the area is operation input outside the area (step S22). More specifically, it is determined that operation input outside the area is performed by the player. Then, assuming that operation input assigned to the operation input outside the area is performed, a process, such as a game process, is executed (step S23). For example, a process associated with the operation input assigned to the operation input outside the area is executed.

As described above, in the present embodiment, the touching operation outside the virtual touch area is regarded as the operation input outside the area. This enables the player to perform various operations by performing the operation input outside the area, thereby improving the operation interface environment of the player. For example, in the present embodiment, the operation input outside the area is assigned to a predetermined operation performed by the player. Therefore, when the player performs the operation input outside the area, it is determined that the predetermined operation to which the operation input outside the area is assigned is performed, and various processes corresponding to the predetermined operation are executed. This improves the convenience of the player. For example, in the present embodiment, the operation input outside the area is assigned to an operation for switching the game mode, an operation for pausing the game progress, and an operation for taking a screenshot, which will be described later. With this configuration, it is possible to switch the game mode, pause the game progress, and take a screenshot when the player performs the operation input outside the area. Alternatively, the operation input outside the area may be assigned to an operation for activating a special move or skill of the character. This enables the character operated by the player to actuate a special move or skill when the player performs the operation input outside the area. Alternatively, the operation input outside the area may be assigned to an operation for setting options. With this configuration, the operation input outside the area performed by the player serves as a shortcut operation, and it is regarded that a series of operations for setting options has been performed. This enables the player to perform option setting, which normally requires complicated operation, by simply performing the operation input outside the area, thereby improving the convenience of the player.

In this case, the player may be allowed to freely select the predetermined operation to which the operation input outside the area is assigned. For example, the operation input outside the area is assigned to either an operation of switching the game mode, an operation of pausing the game progress, or an operation of taking a screenshot according to the option setting or the like by the player. This enables the player to perform operation input outside the area to thereby perform an operation corresponding to the operation input outside the area that was assigned by the player himself/ herself in the option setting or the like, thereby improving the operation interface environment of the player.

Figure 12:
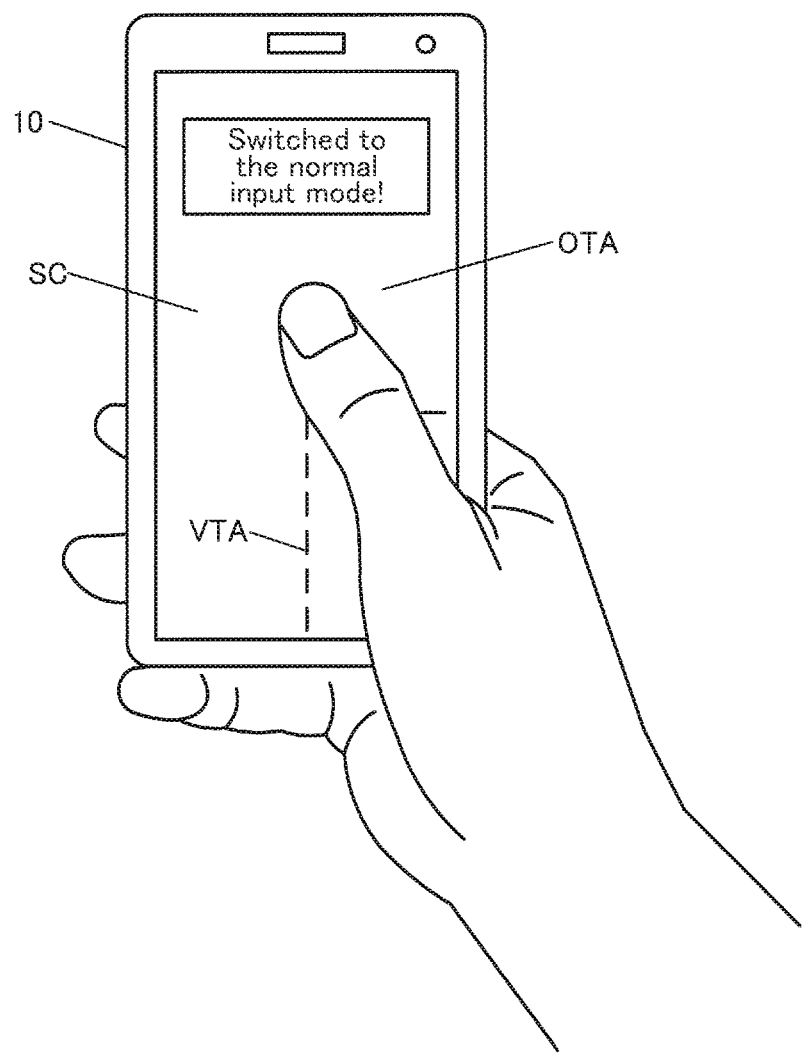
FIG. 12 is an explanatory view regarding switching to a normal input mode by operation input outside the area.

For example, in the present embodiment, when the operation input outside the area is performed, the virtual input mode in which the mapping coordinates are set as the input coordinates is switched to the normal input mode in which the touching operation coordinates are set as the input coordinates. More specifically, in FIG. 12, the player performs a touching operation in OTA, which is outside the virtual touch area VTA, instead of touching operation within the virtual touch area VTA. By thus performing a touching operation with respect to the OTA, i.e., outside the virtual touch area, it is determined that the operation input outside the area is performed. As a result, for example, the virtual input mode is switched to the normal input mode. This enables switching from the virtual input mode to the normal input mode when the player, who has been playing the game by performing touching operations in the virtual touch area VTA, performs the operation input outside the area. Then, when the player touches a position required for the gameplay on the entire screen of the touch screen SC, a game process is performed using the touching operation coordinates at that position as the input coordinates. For example, the player can proceed with the game by directly touching an icon required for advancing the game, a character operated by the player, or an enemy character in the touch screen SC.

Figure 13:
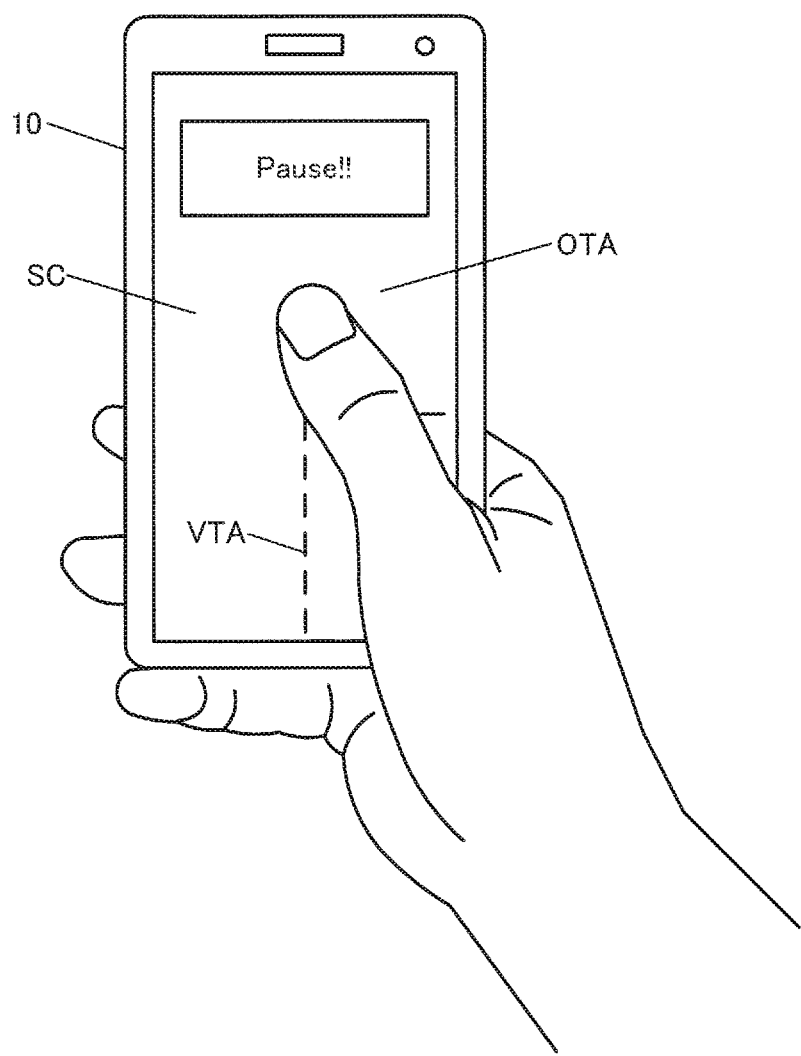
FIG. 13 is an explanatory view regarding a pause of game progress by operation input outside the area.

Further, in the present embodiment, a process of pausing the game progress is executed when the operation input outside the area is performed. More specifically, in FIG. 13, the player is performing an operation of touching the OTA, which is outside the virtual touch area VTA. When such an operation of touching the OTA, i.e., outside the virtual touch area, is performed, it is determined that the operation input outside the area is performed, and the game progress is paused. This enables the player, who was playing the game by performing a touching operation in the virtual touch area VTA, to pause the game in progress by performing the operation input outside the area. For example, during the game progress, such as when the player is playing a game by performing a drag operation in the virtual touch area VTA as shown in FIG. 6 to move the character CH, or performing a touching operation in the virtual touch area VTA as shown in FIG. 7 to select the enemy character CHE1, which is the attack target, if the play cannot continue the gameplay because he has to do other things, the player touches the OTA, which is outside the virtual touch area VTA, i.e., performs the operation input outside the area. As a result, the game progress is paused, enabling the player to do things other than gameplay during this pause period. Alternatively, while the game is in progress, the game may be paused by the operation input outside the area so as to give time to equip weapons and items.

Figure 14:
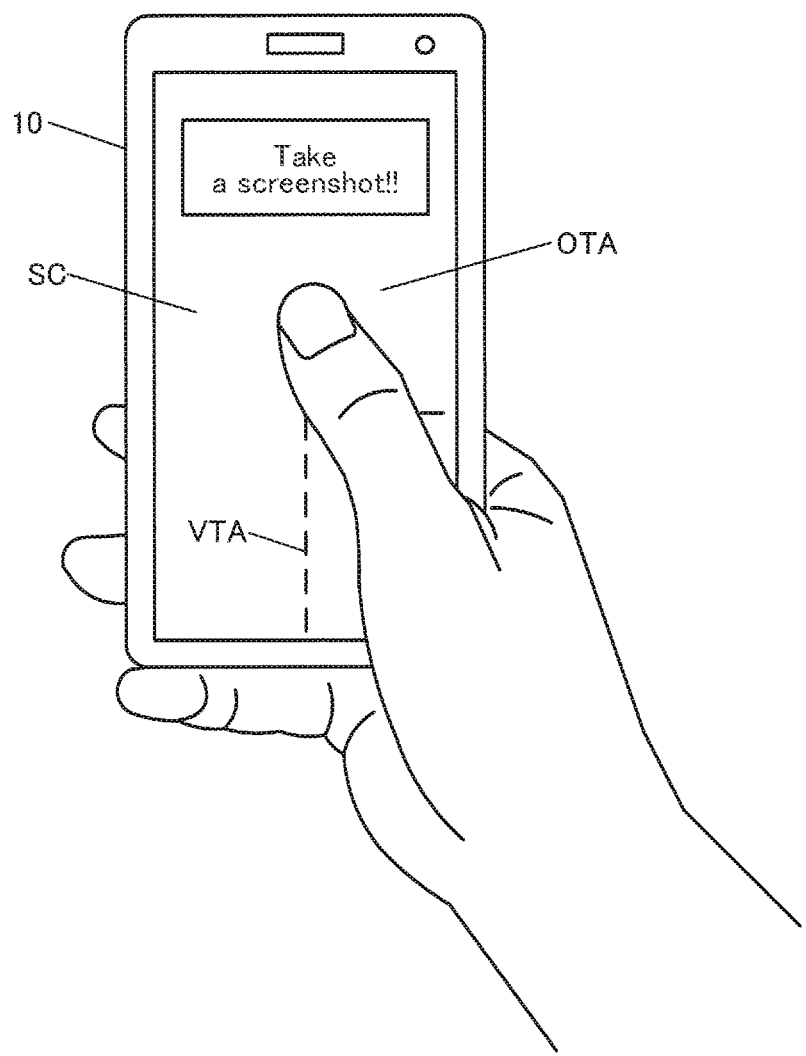
FIG. 14 is an explanatory view regarding a process of taking a screenshot by operation input outside the area.

In addition, in the present embodiment, a process of generating a screenshot of a game image is performed when the operation input outside the area is performed. More specifically, in FIG. 14, the player is performing an operation of touching the OTA, which is outside the virtual touch area VTA. As a result, it is determined that the operation input outside the area has been performed, and a screenshot of a game image is taken. For example, during the gameplay, such as when the player is playing a game by performing a drag operation in the virtual touch area VTA as shown in FIG. 6 to move the character CH, or performing a touching operation in the virtual touch area VTA as shown in FIG. 7 to select the enemy character CHE1, which is the attack target, if the player wants to capture the game image, the player can take a screenshot of the game image at the time by performing the operation input outside the area. This enables the player to take a screenshot of a desired game image during the gameplay, thereby improving the convenience of the player.

Figure 15:
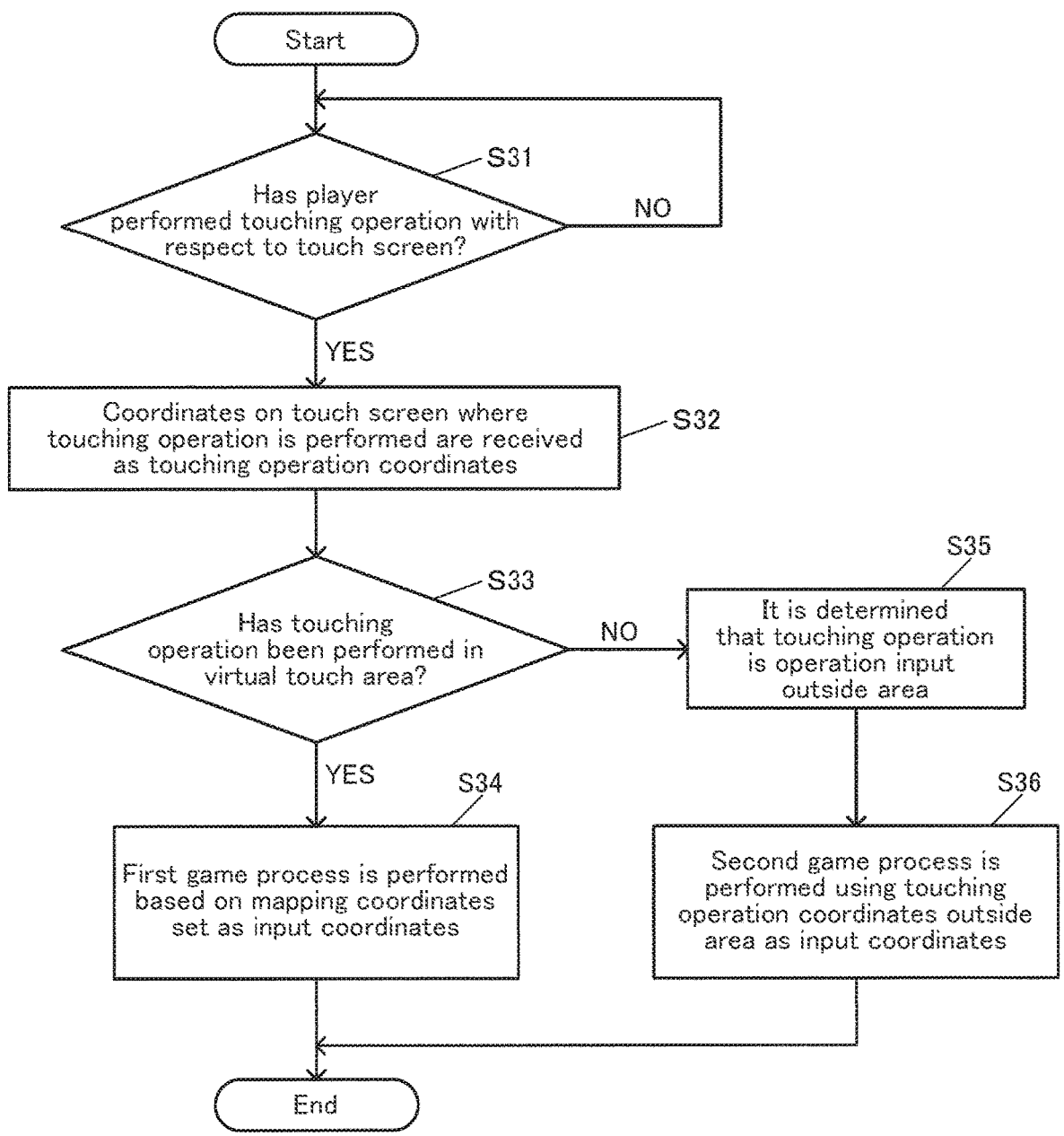
FIG. 15 is a flowchart of a process in which a game process is changed depending on whether the operation given was touching operation in a virtual touch area or operation input outside the area.

Further, in the present embodiment, when a touching operation is performed with respect to the virtual touch area, the first game process is performed by using the mapping coordinates as input coordinates. Further, when the operation input outside the area is performed, the second game process is performed using the touching operation coordinates outside the area as the input coordinates. With this configuration, a game operation according to the first game process is performed by the touching operation in the virtual touch area, and the game or the like proceeds. Then, when the player performs the operation input outside the area, a game operation according to the second game process is performed based on the touching operation coordinates outside the area, and the game or the like proceeds. FIG. 15 is a flowchart for explaining a process in which a game process is changed depending on whether the operation given was touching operation in a virtual touch area or operation input outside the area.

First, it is determined whether or not the player has performed a touching operation with respect to the touch screen (step S31). Then, if it is determined that the touching operation is performed, the coordinates on the touch screen where the touching operation is performed are received as the touching operation coordinates (step S32).

Next, it is determined whether or not a touching operation was performed in the virtual touch area based on the received touching operation coordinates (step S33). More specifically, it is determined whether the touching operation coordinates are coordinates inside the virtual touch area or outside the area. Then, if it is a touching operation with respect to the virtual touch area, the first game process is performed based on the mapping coordinates set as the input coordinates (step S34). On the other hand, if it is not the touching operation with respect to the virtual touch area, it is determined that the touching operation is the operation input outside the area (step S35). Then, the second game process is performed using the touching operation coordinates outside the area as the input coordinates (step S36).

For example, the touching operation by the player in the virtual touch area executes the first game process that performs control of the movement or aggressive actions of the character as shown in FIGS. 6 and 7 using the mapping coordinates as the input coordinates. In contrast, the operation input outside the area by the player executes the second game process for selecting a menu icon as shown in FIG. 5 using the touching operation coordinates outside the area as the input coordinates. More specifically, although the menu icon is selected based on the mapping coordinates in FIG. 5, in this case, the menu icon is directly selected based on the touching operation coordinates. Alternatively, it may also be inversely arranged such that the first game process is executed to select a menu icon using the mapping coordinates as the input coordinates, and that the second game process is performed to control the movement or aggressive actions of the character using the touching operation coordinates outside the area as the input coordinates.

This makes it possible to enable both the first game process based on the touching operation in the virtual touch area and the second game process based on the touching operation outside the virtual touch area, thereby performing various types of game process. Further, it becomes possible to enable a game process in which the touching operation in the virtual touch area is suitable for the game operation by the first game process that uses the mapping coordinates as the input coordinates, and enable a game process in which the touching operation outside the virtual touch area is suitable for the game operation by the second game process that uses the touching operation coordinates as the input coordinates. This makes it possible to execute the first and second game processes while setting coordinates suitable for them as the input coordinates.

2.4 Change of Virtual Touch Area, Identification Display of Virtual Touch Area

The present embodiment performs a process of changing the position, size, or shape of the virtual touch area in the touch screen. For example, the virtual touch area is changed according to the game status. By thus performing the process of changing the position, size, or shape of the virtual touch area, it becomes possible to dispose the virtual touch area at an appropriate position according to each status, or set an appropriate size or shape of the virtual touch area according to each status. For example, by changing the virtual touch area according to the game status, the virtual touch area can be modified to an appropriate state according to the game status.

Figure 16:
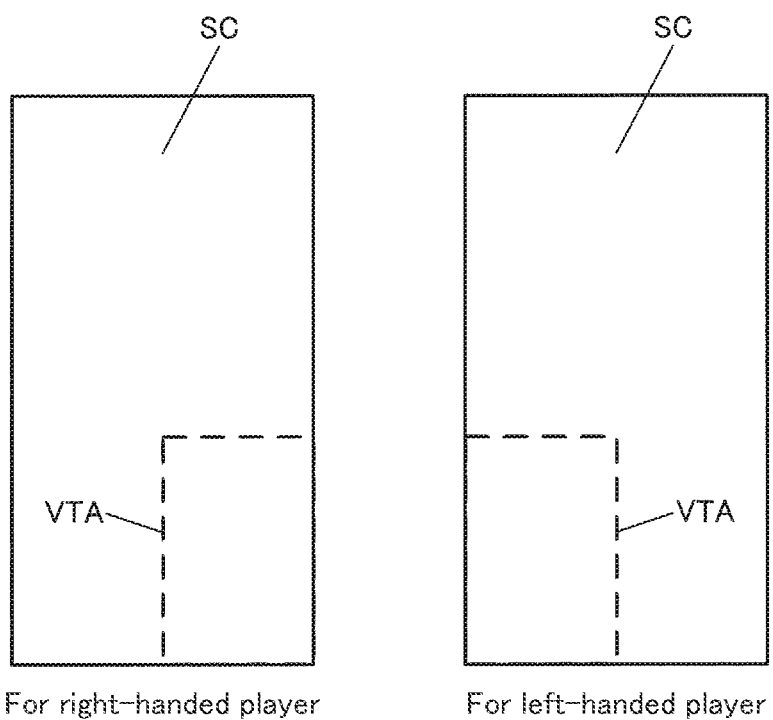
FIG. 16 is an explanatory view of a process of changing a virtual touch area.

For example, as shown in FIG. 16, when the player is right-handed, the position of the virtual touch area VTA in the touch screen SC is disposed, for example, at the lower right position of the touch screen SC. When the right-handed player performs a game operation with one hand, the player is believed to hold the terminal device 10 with the right hand, which is the dominant hand, and performs touching operations using a finger of the right hand. Therefore, by disposing the virtual touch area VTA at the lower right position of the touch screen SC, it becomes possible to dispose the virtual touch area VTA at a position suitable for a right-handed player. In contrast, when the player is left-handed, the position of the virtual touch area VTA in the touch screen SC is disposed, for example, at the lower left position of the touch screen SC. When the left-handed player performs a game operation with one hand, the player is believed to hold the terminal device 10 with the left hand, which is the dominant hand, and performs touching operations using a finger of the left hand. Therefore, by disposing the virtual touch area VTA at the lower left position of the touch screen SC, it becomes possible to dispose the virtual touch area VTA at a position suitable for a left-handed player.

Whether the player is right-handed or left-handed may be set in advance by the player, for example, in the option menu, or may be automatically determined. For example, when the player frequently touches the lower right side of the touch screen SC of the terminal device 10, it is assumed that the player is right-handed. In contrast, when the player frequently touches the lower left side of the touch screen SC, it is assumed that the player is left-handed. This estimation process may be performed by machine learning using AI or the like.

Figure 17:
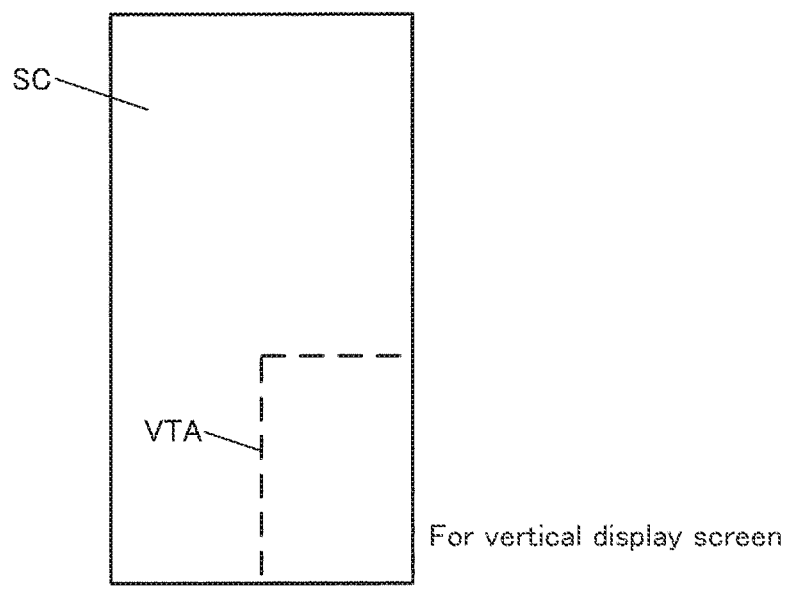
FIG. 17 is an explanatory view of a process of changing a virtual touch area.
Figure 17:
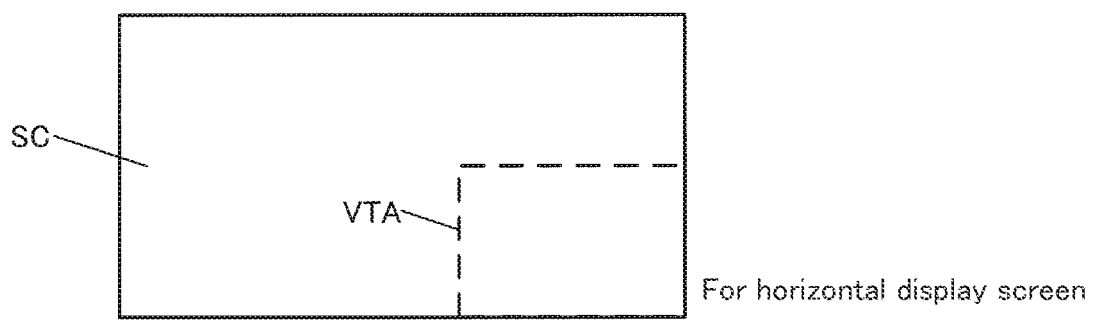

Further, when the terminal device 10, such as a smartphone, has a vertical display screen, the virtual touch area VTA is disposed at the lower right side of the vertical display screen as shown in FIG. 17. If the player is left-handed, the virtual touch area VTA is disposed at the lower left side of the vertical display screen. In contrast, when the terminal device 10 has a horizontal display screen, the virtual touch area VTA is disposed at the lower right side of the horizontal display screen as shown in FIG. 17. If the player is left-handed, the virtual touch area VTA is disposed at the lower left side of the horizontal display screen. Switching between a vertical display screen and a horizontal display screen can be performed by orientation detection using an orientation sensor, such as a gyro sensor, or an acceleration sensor included in the terminal device 10.

Since a lower right position of a horizontal display screen corresponds to an upper right position of a vertical display screen, in FIG. 17, the position of the virtual touch area VTA in the touch screen SC is changed depending on whether the display screen is a vertical display screen or a horizontal display screen. The shape of the virtual touch area VTA may also be changed depending on whether the display screen is a vertical display screen or a horizontal display screen. For example, it is possible to change the aspect ratio of the virtual touch area VTA. By thus changing the size or shape of the virtual touch area VTA depending on whether the display screen is a vertical display screen or a horizontal display screen, it is possible to set an appropriate size, shape, or the like of the virtual touch area VTA for the vertical display screen or the horizontal display screen.

Figure 18:
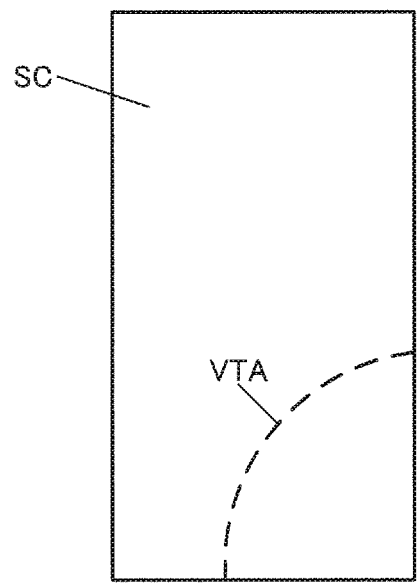
FIG. 18 is an explanatory view of a process of changing a virtual touch area.

Further, in FIG. 18, a fan-shaped virtual touch area VTA (boundary shape) is provided to allow the player to easily perform a touching operation in the virtual touch area VTA using the thumb as shown in FIG. 3. The virtual touch area VTA having such a shape enables the player to easily perform the instruction of touching operation coordinates by touching the virtual touch area VTA when the player performs game operation while holding the terminal device 10 with one hand, thereby improving the operation interface environment of the player. Preferably, the position, size, or shape of the virtual touch area VTA can be set by the player, for example, in the option menu. For example, it is preferably arranged such that the position, size, or shape of the virtual touch area VTA can be variably customized by the player.

Figure 19:
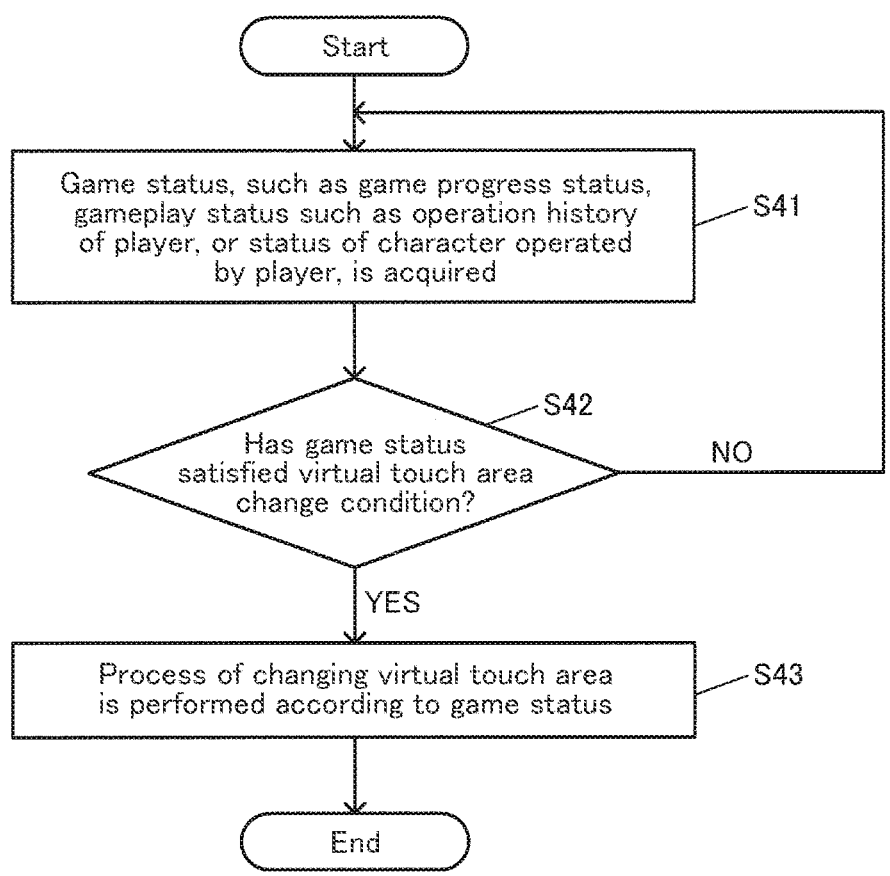
FIG. 19 is a flowchart for explaining a process of changing a virtual touch area.

FIG. 19 is a flowchart for explaining a process of changing a virtual touch area. First, the game status, such as the game progress status, the gameplay status such as the operation history of the player, or the status of the character operated by the player, is acquired (step S41). For example, the game status is determined according to various game processes in the game processing section 108. Next, it is determined whether or not the game status satisfies the virtual touch area change condition (step S42). When the change condition is satisfied, a process of changing the virtual touch area is performed according to the game status (step S43).

As described above, in the present embodiment, the virtual touch area is changed according to the game status. For example, the position, size, shape, or the like of the virtual touch area is changed according to the game status. For example, in a game status in which a detailed game operation is required, the touching operation in the virtual touch area using the thumb as shown in FIG. 3 is difficult. Therefore, in such a game status, the size of the virtual touch area is increased. In contrast, in a game status in which a detailed game operation is not required, the size of the virtual touch area is reduced. For example, it may be arranged such that, in the first game status, a virtual touch area having a very small size is disposed at the right corner or the left corner of the touch screen, and that, then, when the first game status is changed to the second game status, the size of the virtual touch area may be returned to the normal size as shown in FIG. 3. Alternatively, it may be arranged such that the operation history of the touching operation by the player is monitored, and the position, size, or shape of the virtual touch area is set to the position, size, or shape according to the operation history. Alternatively, the position, size, or shape of the virtual touch area may be set according to the game score or the game level of the player. For example, when the player achieves a predetermined game score, or when the player achieves a predetermined game level, the position, size, or shape of the virtual touch area is set to a position, size, or shape suitable for the game operation. For example, when the player achieves a predetermined game score or game level, the setting of a virtual touch area having a special shape as shown in FIG. 18 is permitted. Alternatively, it is also possible to set the position, size, or shape of the virtual touch area according to the type or size of the character used by the player. For example, the shape of the virtual touch area is changed according to the type of the character, or the size of the virtual touch area is changed according to the size of the character. This enables appropriate setting of the position, size, or shape of the virtual touch area according to the game status, thereby improving the game operation environment of the player.

Figure 20:
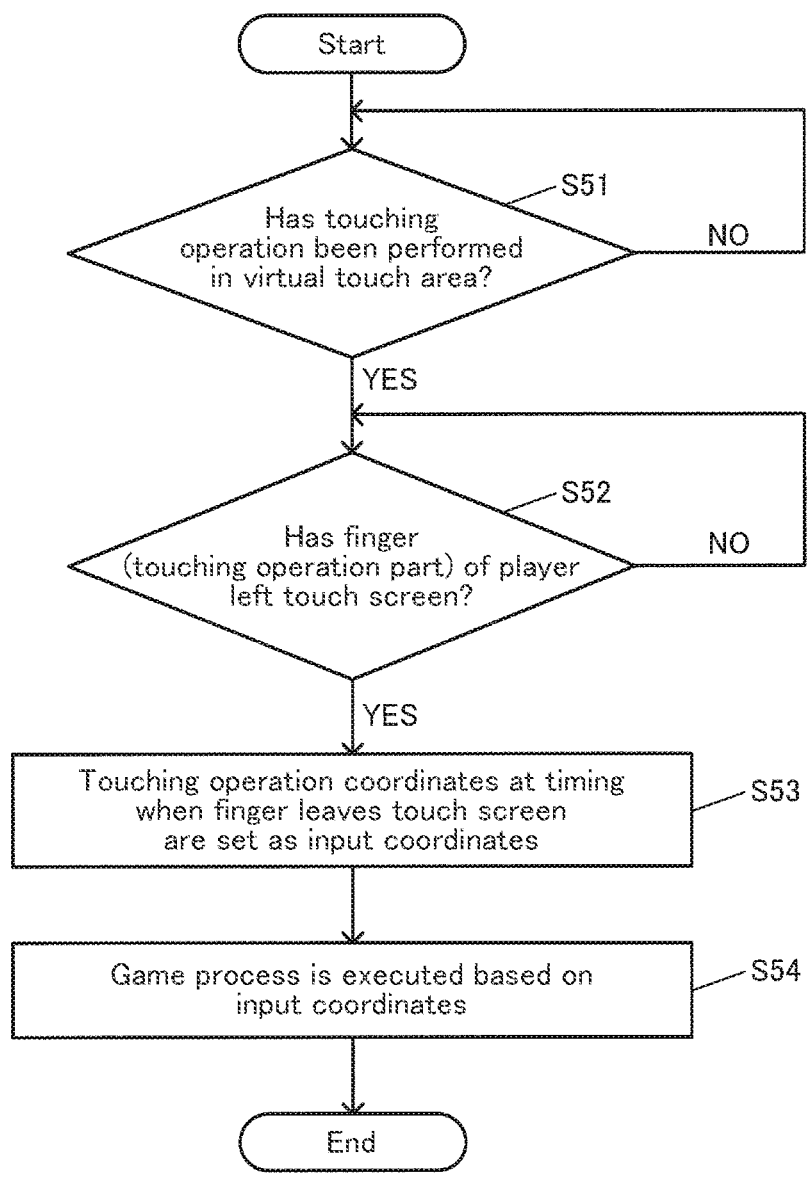
FIG. 20 is a flowchart for explaining a process of setting touching operation coordinates as input coordinates at a timing when a touching operation part is separated.

Further, in the present embodiment, after the touching operation is performed in the virtual touch area, the mapping coordinates corresponding to the touching operation coordinates at the timing when the touching operation part, such as a finger, of the player leaves the touch screen are set as the input coordinates. For example, instead of setting the touching operation coordinates at the timing when the touching operation part touches the touch screen, the mapping coordinates corresponding to the touching operation part at the timing when the touching operation part leaves the touch screen are set as the input coordinates. FIG. 20 is a flowchart for explaining a process of setting touching operation coordinates as input coordinates at a timing when a touching operation part is separated.

First, it is determined whether or not a touching operation with respect to the virtual touch area is performed (step S51). Then, if it is determined that the touching operation is performed, it is further determined whether or not the finger, which is the touching operation part, of the player, has left the touch screen (step S52). In this case, the touching operation coordinates are sequentially stored in advance in the storage section 170 until the finger leaves the touch screen. Then, if it is determined that the finger has left the touch screen, the touching operation coordinates at the timing when the finger leaves the touch screen are set as the input coordinates (step S53). For example, the touching operation coordinates at the timing when the finger leaves the touch screen are selected from the group of touching operation coordinates stored in the storage section 170, and set as the input coordinates. Then, the game process is executed based on the input coordinates (step S54).

This enables the player to correct the touching operation position by slightly moving the touching operation part, i.e., a finger, after performing the touching operation in the virtual touch area. Then, the mapping coordinates corresponding to the touching operation coordinates at the timing when the finger leaves the touch screen are thereafter set as the input coordinates, and the game process is executed.

It is also possible to store the touching operation coordinates at the timing when the finger leaves the touch screen, and determine the stored touching operation coordinates as the input coordinates when the player performs a predetermined operation such as re-tapping the screen.

Further, in the present embodiment, identification display of the virtual touch area is performed in the touch screen. For example, in FIG. 21, identification display to display a boundary VTD of the virtual touch area VTA in the touch screen SC is performed, thereby allowing the player to identify the position, size, shape, and the like of the virtual touch area VTA. By thus performing the identification display of the virtual touch area VTA, the player can visually identify the target region of the touching operation, thereby improving the operation interface environment of the player.

Figure 21:
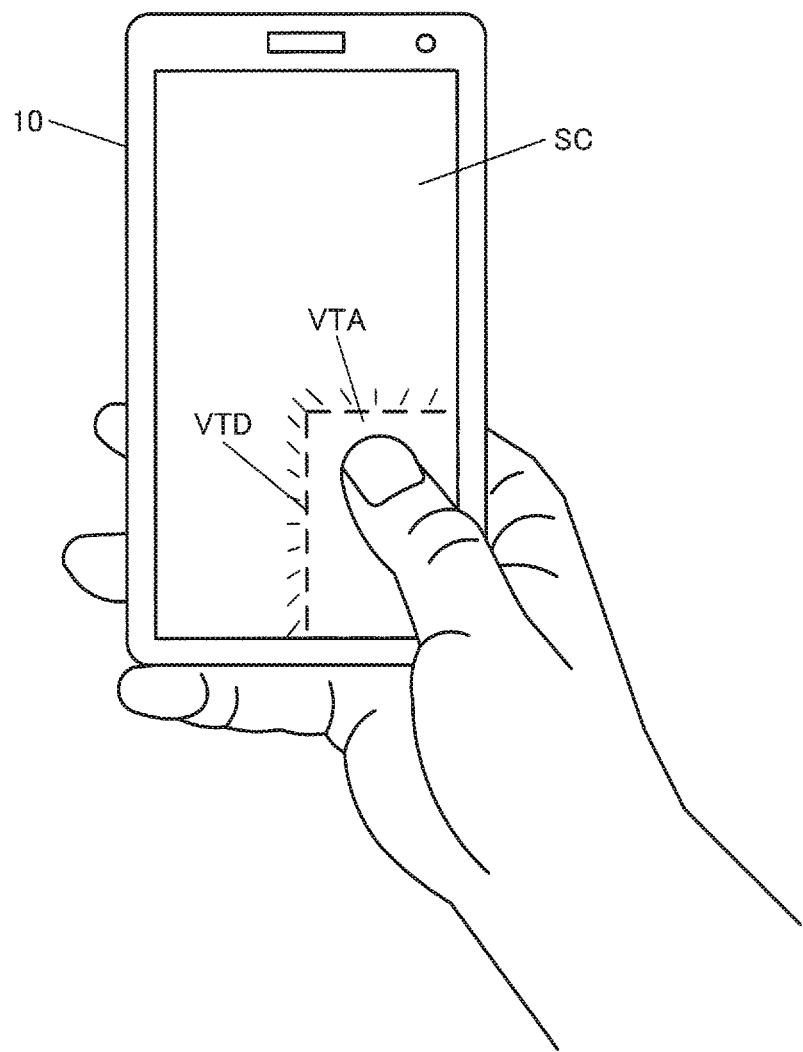
FIG. 21 is an explanatory view regarding identification display of a virtual touch area.
Figure 22:
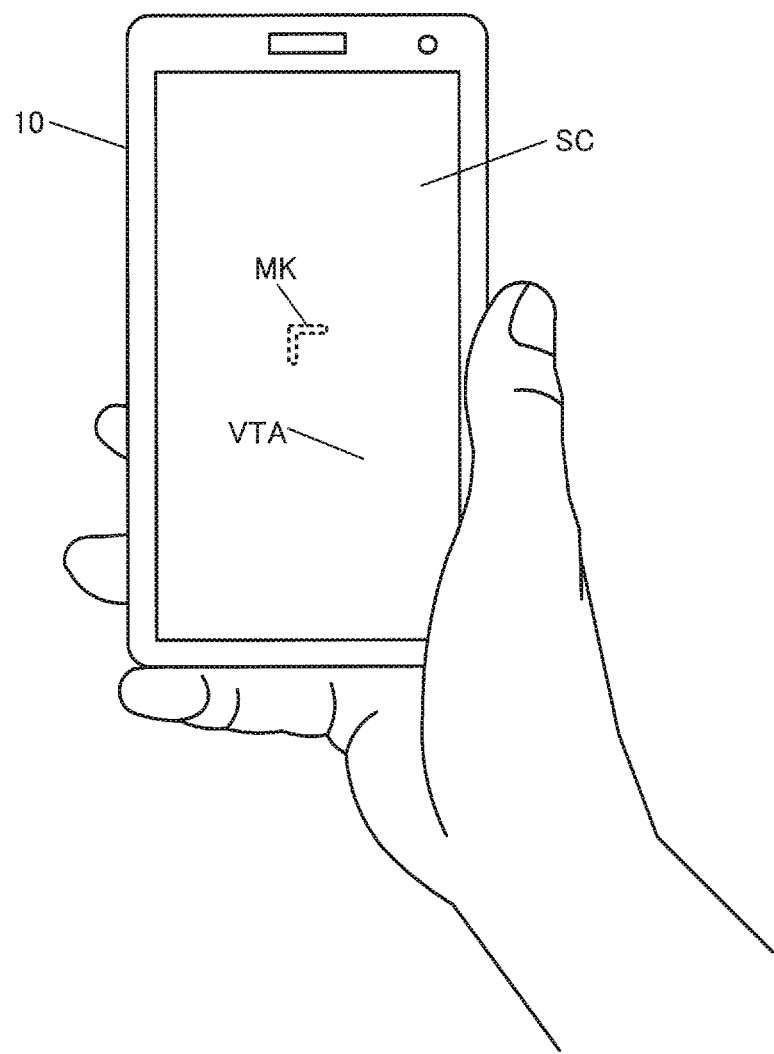
FIG. 22 is an explanatory view regarding identification display of a virtual touch area.

For example, in FIG. 22, identification display to display a marker MK indicating the position of the upper left corner of the virtual touch area VTA in the touch screen SC is performed, thereby allowing the player to identify the position, size, and the like of the virtual touch area VTA. When the player is left-handed as shown in FIG. 16, it may be arranged such that the marker MK indicating the position of the upper right corner of the virtual touch area VTA is displayed. Alternatively, it may be arranged such that the identification display to display the boundary VTD of the virtual touch area VTA is performed as shown in FIG. 21 at the timing when the player touches the virtual touch area VTA, and that a simple identification display to display only the marker MK as shown in FIG. 22 is performed when a predetermined time has passed after the touch timing. When the boundary VTD of the virtual touch area VTA is displayed as shown in FIG. 21, there is a possibility that the display of the boundary VTD interferes with the display of the game image, and the player cannot clearly see the game image. On the other hand, the identification display that displays only the marker MK as shown in FIG. 22 does not significantly interfere with the display of the game image compared with the display of the boundary VTD, and the player can see the game image more clearly.

The identification display of the virtual touch area is not limited to those shown in FIGS. 21 and 22, and may be performed in various ways. For example, it is possible to perform identification display by changing the color tone or the luminance in the virtual touch area from those in other regions. For example, it is possible to perform the identification display by combining a rectangular translucent image having a predetermined color with the virtual touch area by alpha blending. Alternatively, the identification display may be performed so that the luminance of the virtual touch area becomes higher than the luminances of other regions of the touch screen.

In accordance with one of some embodiments, it is possible to provide a game system, a processing method, an information processing medium, and the like that enable operation input for a game process by performing a touch operation in a narrow touch operation range.

One of the present embodiments relates to a game system including a processor including hardware, wherein the processor performs a reception process of receiving coordinates of a touching operation in a touch screen as touching operation coordinates when the touching operation is performed by a player with respect to the touch screen; a virtual touch area process of associating the touching operation coordinates in a virtual touch area that is set in the touch screen as an area smaller than the touch screen with mapping coordinates on the touch screen; when the touching operation is performed with respect to the virtual touch area, an input process of setting the mapping coordinates as input coordinates, assuming that the touching operation is performed with respect to the mapping coordinates associated with the touching operation coordinates in the virtual touch area in which the touching operation is performed; and a game process based on the input coordinates.

In accordance with one of some embodiments, when a touching operation is performed with respect to a touch screen, the touching operation coordinates at which the touching operation is performed are received. Then, when the touching operation is performed with respect to the virtual touch area, the mapping coordinates associated with the touching operation coordinates in the virtual touch area are set as the input coordinates, and a game process is performed based on the input coordinates that are the mapping coordinates. More specifically, when a touching operation is performed with respect to the virtual touch area set on the touch screen as an area smaller than the touch screen, it is determined that the touching operation is performed with respect to the mapping coordinates associated with the touching operation coordinates; as a result, a game process is performed using the mapping coordinates as input coordinates. As a result, it is possible to provide a game system or the like that enables an operation input for a game process by performing a touch operation in a narrow touch operation range.

In one of the present embodiments, the processor may perform a notification process of notifying the player of a position of the mapping coordinates associated with the touching operation coordinates in the virtual touch area when the touching operation is performed with respect to the virtual touch area.

As a result, in some embodiments, the player can easily confirm the position of the mapping coordinates corresponding to the position of the touching operation when the player performs a touching operation with respect to the virtual touch area, thereby improving the convenience of the player.

In one of the present embodiments, the processor may set the mapping coordinates as the input coordinates in a virtual input mode, and sets the touching operation coordinates as the input coordinates in a normal input mode.

As a result, in some embodiments, by providing two input modes, such as the virtual input mode and the normal input mode, a suitable input mode can be set according to various statuses, thereby allowing the player to play appropriate game operations.

In one of the present embodiments, the processor may switch between the virtual input mode and the normal input mode according to the game status.

As a result, in some embodiments, a suitable input mode can be set according to the game status, thereby allowing the player to play appropriate game operations.

In one of the present embodiments, the processor may determine that the touching operation performed outside the virtual touch area is operation input outside the area when the touching operation is performed outside the virtual touch area.

As a result, in some embodiments, the touching operation outside the virtual touch area is regarded as the operation input outside the area. This enables the player to perform various operations by performing the operation input outside the area, thereby improving the operation interface environment of the player.

In one of the present embodiments, the processor may assign the operation input outside the area to a predetermined operation performed by the player.

As a result, in some embodiments, when the player performs the operation input outside the area, it is determined that the predetermined operation to which the operation input outside the area is assigned is performed, and various processes corresponding to the predetermined operation are executed. This improves the convenience of the player.

In one of the present embodiments, the processor may switch a virtual input mode in which the mapping coordinates are set as the input coordinates to a normal input mode in which the touching operation coordinates are set as the input coordinates when the operation input outside the area is performed.

As a result, in some embodiments, the virtual input mode is switched to the normal input mode when the player, who has been playing the game by performing touching operations in the virtual touch area, performs the operation input outside the area.

In one of the present embodiments, the processor may perform a process of pausing the game progress when the operation input outside the area is performed.

As a result, in some embodiments, when the player, who was playing the game by performing a touching operation in the virtual touch area, performs the operation input outside the area, the game in progress is paused.

In one of the present embodiments, the processor may perform a process of generating a screenshot of a game image when the operation input outside the area is performed.

As a result, in some embodiments, a screenshot of a game image at that time point is generated when the player performs the operation input outside the area, thereby improving the convenience of the player.

In one of the present embodiments, the processor may perform a first game process using the mapping coordinates as the input coordinates when the touching operation is performed with respect to the virtual touch area, and performs a second game process different from the first game process using the touching operation coordinates outside the virtual touch area as the input coordinates when the operation input outside the area is performed.

As a result, in some embodiments, it becomes possible to enable both the first game process based on a touching operation in the virtual touch area and the second game process based on a touching operation outside the virtual touch area, thereby performing various types of game process.

In one of the present embodiments, the processor may perform a process of changing a position, size or shape of the virtual touch area in the touch screen.

As a result, in some embodiments, it becomes possible to dispose the virtual touch area at an appropriate position according to each status, or set an appropriate size or shape of the virtual touch area according to each status.

In one of the present embodiments, the processor may change the virtual touch area according to the game status.

As a result, in some embodiments, the virtual touch area can be changed to an appropriate state according to the game status.

In one of the present embodiments, after the touching operation in the virtual touch area is performed, the processor sets the mapping coordinates corresponding to the touching operation coordinates at a timing when a touching operation part of the player leaves the touch screen as the input coordinates.

As a result, in some embodiments, the player can correct the touching operation position by moving the touching operation part after performing the touching operation in the virtual touch area using the touching operation part. Then, the mapping coordinates corresponding to the touching operation coordinates at the timing when the touching operation part leaves the touch screen is thereafter set as the input coordinates.

In one of the present embodiments, the processor may perform identification display of the virtual touch area in the touch screen.

By thus performing the identification display of the virtual touch area, the player can identify the target region of the touching operation, thereby improving the operation interface environment of the player.

One of the present embodiments relates to a processing method of performing a reception process of receiving coordinates of a touching operation in a touch screen as touching operation coordinates when the touching operation is performed by a player with respect to the touch screen; a virtual touch area process of associating the touching operation coordinates in a virtual touch area that is set in the touch screen as an area smaller than the touch screen with mapping coordinates on the touch screen; when the touching operation is performed with respect to the virtual touch area, an input process of setting the mapping coordinates as input coordinates, assuming that the touching operation is performed with respect to the mapping coordinates associated with the touching operation coordinates in the virtual touch area in which the touching operation is performed; and a game process based on the input coordinates.

One of the present embodiments relates to a computer-readable information storage medium storing a program for causing a computer to perform the processing method described above.

Although the present embodiments have been described in detail above, those skilled in the art will readily appreciate that many modifications are possible in the embodiment without materially departing from the novel teachings and advantages of the present disclosure. Accordingly, all such modifications are intended to be included within the scope of the present disclosure. For example, in the specification or the drawings, each of terms (such as a finger) that is at least once used together with another broader-sense or synonymous term (such as a touching operation part) can be replaced with the other term at any part of the specification or the drawings. In addition, the touching operation coordinates reception process, the process of associating the mapping coordinates with the touching operation coordinates, the process of setting the input coordinates, the game process, and the like are also not limited to those described in the present embodiment, and methods, processes, and configurations equivalent to those are also included in the scope of the present disclosure.

What is claimed is:

1. A game system comprising a processor including hardware, the processor being configured to perform:
- a setting process of setting a virtual touch area that is arranged within a touch screen as an area smaller than the touch screen;
- a reception process of receiving coordinates of a touching operation on the touch screen as touching operation coordinates when the touching operation is performed by a player on the touch screen;
- when the touching operation is performed within the virtual touch area, a virtual touch area converting process of converting the touching operation coordinates in the virtual touch area to mapping coordinates on the touch screen, the mapping coordinates being located outside of the virtual touch area;
- when the touching operation is performed within the virtual touch area, an input process of setting the mapping coordinates as input coordinates; and
- a game process based on the input coordinates,
- wherein the processor automatically switches, in response to a predetermined in-game event of the game process occurring, between (1) a virtual input mode in which the virtual touch area converting process is performed when the touching operation is performed within the virtual touch area, and (2) a normal input mode in which the virtual touch area converting process is not performed regardless of a location of the touching operation on the touch screen.

2. The game system as defined in claim 1, wherein the processor performs a notification process of notifying the player of a position of the mapping coordinates associated with the touching operation coordinates in the virtual touch area when the touching operation is performed within the virtual touch area.

3. The game system as defined in claim 1, wherein, the processor is further configured such that when the touching operation is performed outside the virtual touch area, the processor determines that the touching operation performed outside the virtual touch area is operation input outside the area.

4. The game system as defined in claim 3, wherein the processor assigns the operation input outside the area to a predetermined operation performed by the player.

5. The game system as defined in claim 3, wherein, when the operation input outside the area is performed, the processor switches from the virtual input mode to the normal input mode.

6. The game system as defined in claim 3, wherein, when the operation input outside the area is performed, the processor performs a process of pausing game progress.

7. The game system as defined in claim 3, wherein, when the operation input outside the area is performed, the processor performs a process of generating a screenshot of a game image.

8. The game system as defined in claim 3, wherein the processor performs a first game process using the mapping coordinates as the input coordinates when the touching operation is performed within the virtual touch area, and performs a second game process different from the first game process using the touching operation coordinates outside the virtual touch area as the input coordinates when the operation input outside the area is performed.

9. The game system as defined in claim 1, wherein the processor performs a process of changing a position, size or shape of the virtual touch area in the touch screen.

10. The game system as defined in claim 1, wherein the processor changes a position, size, or shape of the virtual touch area according to the game status of the game process.

11. The game system as defined in claim 1, wherein, after the touching operation in the virtual touch area is performed, the processor sets the mapping coordinates corresponding to the touching operation coordinates at a timing when a touching operation part of the player leaves the touch screen as the input coordinates.

12. The game system as defined in claim 1, wherein the processor performs identification display of the virtual touch area in the touch screen.

13. A processing method comprising:
- performing a setting process of setting a virtual touch area that is arranged within a touch screen as an area smaller than the touch screen;
- performing a reception process of receiving coordinates of a touching operation on the touch screen as touching operation coordinates when the touching operation is performed by a player on the touch screen;
- determining that the touching operation is performed within the virtual touch area;
- performing a virtual touch area converting process of converting the touching operation coordinates in the virtual touch area to mapping coordinates on the touch screen, the mapping coordinates being located outside of the virtual touch area;
- performing an input process of setting the mapping coordinates as input coordinates;
- performing a game process based on the input coordinates; and
- automatically switching, in response to a predetermined in-game event of the game process occurring, between (1) a virtual input mode in which the virtual touch area converting process is performed when the touching operation is performed within the virtual touch area, and (2) a normal input mode in which the virtual touch area converting process is not performed regardless of a location of the touching operation on the touch screen.

14. A computer-readable non-transitory information storage medium storing a program for causing a computer to execute steps comprising:
- performing a setting process of setting a virtual touch area that is arranged within a touch screen as an area smaller than the touch screen;
- performing a reception process of receiving coordinates of a touching operation on the touch screen as touching operation coordinates when the touching operation is performed by a player on the touch screen;
- determining that the touching operation is performed within the virtual touch area;
- performing a virtual touch area converting process of converting the touching operation coordinates in the virtual touch area to mapping coordinates on the touch screen, the mapping coordinates being located outside of the virtual touch area;
- performing an input process of setting the mapping coordinates as input coordinates;
- performing a game process based on the input coordinates; and
- automatically switching, in response to a predetermined in-game event of the game process occurring, between (1) a virtual input mode in which the virtual touch area converting process is performed when the touching operation is performed within the virtual touch area, and (2) a normal input mode in which the virtual touch area converting process is not performed regardless of a location of the touching operation on the touch screen.

\* \* \* \* \*